United States Patent
Ro et al.

(10) Patent No.: US 10,299,289 B2
(45) Date of Patent: May 21, 2019

(54) METHOD AND APPARATUS FOR TRANSMITTING CONTROL INFORMATION FOR DEVICE-TO-DEVICE COMMUNICATION

(71) Applicant: Samsung Electronics Co., Ltd., Suwon-si, Gyeonggi-do (KR)

(72) Inventors: Sangmin Ro, Seoul (KR); Yongjun Kwak, Yongin-si (KR); Kyeongin Jeong, Yongin-si (KR); Hyoungju Ji, Seoul (KR); Jinyoung Oh, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 120 days.

(21) Appl. No.: 15/033,362

(22) PCT Filed: Nov. 10, 2014

(86) PCT No.: PCT/KR2014/010760
§ 371 (c)(1),
(2) Date: Apr. 29, 2016

(87) PCT Pub. No.: WO2015/069080
PCT Pub. Date: May 14, 2015

(65) Prior Publication Data
US 2016/0278120 A1    Sep. 22, 2016

(30) Foreign Application Priority Data

Nov. 8, 2013   (KR) .................. 10-2013-0135731
Apr. 23, 2014  (KR) .................. 10-2014-0048635

(51) Int. Cl.
*H04W 74/00*    (2009.01)
*H04W 74/08*    (2009.01)
(Continued)

(52) U.S. Cl.
CPC .......... *H04W 74/002* (2013.01); *H04L 67/10* (2013.01); *H04W 74/0808* (2013.01); *H04W 76/14* (2018.02)

(58) Field of Classification Search
None
See application file for complete search history.

(56) References Cited

U.S. PATENT DOCUMENTS

2010/0215020 A1   8/2010  Lee et al.
2012/0163181 A1   6/2012  Xue et al.
(Continued)

FOREIGN PATENT DOCUMENTS

EP    2 830 386 A1    1/2015
KR    10-2010-0072200 A    6/2010
(Continued)

OTHER PUBLICATIONS

Huawei et al., Physical channel design for D2D communication, 3GPP Draft, R1-135386, 3rd Generation Partnership Project (3GPP), Mobile Competence Centre; 650, Route Des Lucioles, F-06921 Sophia-Antipolis Cedex, France, Nov. 1, 2013, vol. RAN WG1, XP050750629, San Francisco, USA.

(Continued)

*Primary Examiner* — Diane L Lo
(74) *Attorney, Agent, or Firm* — Jefferson IP Law, LLP

(57) ABSTRACT

The present invention relates to a method and an apparatus for transmitting control information for device-to-device (D2D) communication. A method for communicating between terminals of a transmission terminal according to an embodiment of the present invention comprises the steps of: determining whether transmission data corresponds to final transmission data; generating a first channel sensing signal including information indicating that the transmission data corresponds to final transmission when the transmission data (Continued)

is final transmission data; and transmitting the transmission data and the first channel sensing signal. According to an embodiment of the present invention, a channel sensing signal, which is necessarily required for a D2D operation of a distributed resource allocation scheme, is used to transmit the control information so that control information can be exchanged between terminals without introducing an additional control channel and signal.

6 Claims, 16 Drawing Sheets

(51) Int. Cl.
  *H04L 29/08* (2006.01)
  *H04W 76/14* (2018.01)

(56) References Cited

U.S. PATENT DOCUMENTS

| | | |
|---|---|---|
| 2014/0286293 A1 | 9/2014 | Jang et al. |
| 2015/0023267 A1 | 1/2015 | Lim et al. |
| 2015/0043558 A1* | 2/2015 | Choi .............. H04W 74/0808 370/338 |
| 2015/0245334 A1* | 8/2015 | Chang .............. H04W 76/14 370/329 |
| 2015/0271840 A1* | 9/2015 | Tavildar .............. H04L 1/08 370/329 |
| 2016/0183276 A1 | 6/2016 | Marinier et al. |
| 2016/0270030 A1* | 9/2016 | Yu .............. H04W 72/005 |

FOREIGN PATENT DOCUMENTS

| | | |
|---|---|---|
| WO | 2010-000309 A1 | 1/2010 |
| WO | 2011/132982 A2 | 10/2011 |
| WO | 2012/088052 A1 | 6/2012 |
| WO | 2012/096493 A2 | 7/2012 |
| WO | 2013/002206 A1 | 1/2013 |
| WO | 2013/002688 A1 | 1/2013 |
| WO | 2013/077684 A1 | 5/2013 |
| WO | 2013-115567 A1 | 8/2013 |
| WO | 2013/141669 A1 | 9/2013 |
| WO | 2013/162333 A1 | 10/2013 |
| WO | 2015-021185 A1 | 2/2015 |

OTHER PUBLICATIONS

Intel Corporation, Resource Allocation for D2D Discovery, 3GPP Draft TSG-RAN2 Meeting #83bis, R2-133512, Oct. 7-11, 2013, Ljubljana, Slovenia.

European Search Report dated Nov. 16, 2017, issued in the European Application No. 14859528.3-1857.

* cited by examiner

FIG. 13
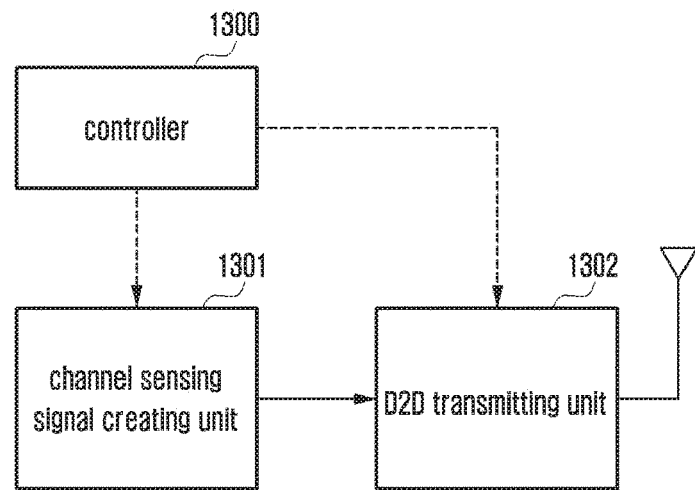
(a)
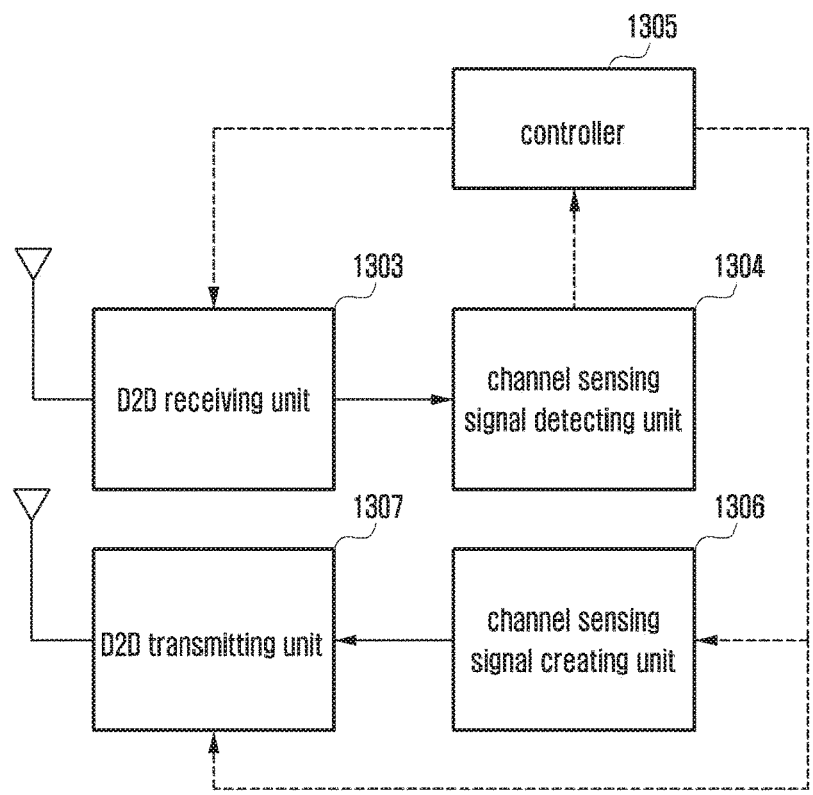
(b)

METHOD AND APPARATUS FOR TRANSMITTING CONTROL INFORMATION FOR DEVICE-TO-DEVICE COMMUNICATION

TECHNICAL FIELD

The present invention relates to a method and apparatus for transmitting control information for device-to-device (D2D) communication, and more particularly, to a method and apparatus for creating and transmitting control information required to support terminals in smoothly performing D2D communication with each other.

BACKGROUND ART $3^{rd}$ Generation Partnership Project (3GPP) as an asynchronous cellular mobile communication standard organization proceeds with the discussion to support wireless communication between mobile terminals or electronic devices, i.e., Device-to-Device (D2D) communication, as well as wireless communication between existing base stations and mobile terminals (user equipment), in Long Term Evolution (LTE) system specification.

One of the primary functions of 3GPP systems required for D2D communication is a function of supporting Public Safety services. That is, although a network is in an emergency state where it cannot provide normal services, e.g., a natural disaster, etc., 3GPP systems need to support LTE-based wireless communication between members in policeman group, firefighter group and/or government agent group, or between the groups. When an emergency occurs, it is more efficient to perform one-to-many communication in a particular group or the entire group, i.e., broadcast communication, rather than perform one-to-one communication between members. The 3GPP has agreed that broadcast communication may employ a D2D communication scheme in current Release-12 (Rel-12). Physical layer feedback of a closed-loop scheme, such as HARQ ACK/NACK, is likely not to be used, considering the features of one-to-many communication.

In D2D communication, radio resources used in a transmitting terminal may employ one of the following two methods. One method refers to a central resource allocation that allows a transmitting terminal to receive radio resources that it will use from a particular resource allocating entity. The particular resource allocating entity may serve as a base station in cellular communication. When networks do not normally provide services, a particular terminal may perform the resource allocation function. In this case, it is ideal to schedule radio resources of terminals in the coverage of the resource allocation terminal, thereby performing D2D communication without a conflict of radio resources, which may be advantageous.

However, the central resource allocation needs to additionally determine a method to select the particular resource allocating terminal and forces a terminal, supposed to perform resource allocation, to support functions, as of a base station. Therefore, the central resource allocation increases in the burden of complexity of terminal which is disadvantageous. The central resource allocation needs to define control channels for transmission/reception of the resource allocation information. When a number of terminals performing resource allocation are adjacent to each other, additional information is required to tune resource allocating terminals in order to prevent a conflict of resource allocation between terminals in the adjacent areas. Although the base station may perform transmission/reception of the tuning information via a wired network, it needs to define separate physical channels or signals for exchanging the turning information between the resource allocating terminals.

The other method refers to a distribution resource allocating method that allows a transmitting terminal to select radio resources that it will use for itself. The process of selecting radio resources in a transmitting terminal may be performed via the Channel Sense Multiple Access/Collision Avoidance (CSMA/CA). That is, a transmitting terminal performs a channel sensing process through a radio resource region set for D2D communication in order to determine whether a corresponding radio resource is currently used for D2D communication with other terminals. When the transmitting terminal ascertains that a corresponding radio resource is occupied by other terminals, it continues performing a channel sensing process to search for available radio resources, without using the radio resource. On the other hand, when the transmitting terminal ascertains that a corresponding radio resource is empty (not occupied), it may transmit its signals via the radio resource. The transmitting terminal in use of radio resources always needs to transmit a channel sensing signal for indicating that it is using the radio resources to other terminals performing a channel sensing process. A channel sensing signal is set to have a sequence-based signal structure, similar to a random access preamble, a Reference Signal (RS), etc.

The distribution resource allocating method using a channel sensing signal has a possibility that a conflict of resources may occur when a number of terminals that have performed a channel sensing process ascertain that a particular radio resource is empty and perform simultaneous transmission of their signals. On the other hand, the distribution resource allocating method does not need a resource allocating terminal performing operations, as of a base station. Therefore, the distribution resource allocating method does not have the burden of complexity of terminal, which is advantageous. The central resource allocating method does not always need the information regarding resource allocation, the information turning between resource allocating terminals, etc., described above, so that they can operate by performing, at least, a signaling, via a channel sensing signal. In order to resolve a conflict of resources between transmitting terminals, a random back-off may be employed. The random back-off refers to a procedure performed in such a way that: when terminals ascertain that a radio resource is empty via a channel sensing process, they respectively continue performing a channel sensing process for back-off times randomly selected. When the terminal does detect a channel sensing signal transmitted from other terminals and thus ascertains that a corresponding radio resource is empty, it starts transmission, or otherwise stops the back-off.

The distribution resource allocating method may also employ another method as follows. The method may include resource information that a transmitting terminal uses in transmitting data in a scheduling assignment (SA) signal and transmit it. Receiving terminals receive the SA signal, identify resources transmitting data of the transmitting terminal, and receive data via a corresponding resource. The resource region through which terminals are capable of transmitting/receiving SA signals may be preset. The settings of the resource region through which terminals are capable of transmitting/receiving SA signals may be known to individual terminals from a base station via system information or by upper layer signaling according to terminals. Alternatively, the range of resources may be set to be fixed and stored in memory devices of individual terminals.

The resource region capable of transmission/reception of SA may be set to have a time period and/or a frequency and may exist periodically, according to the settings. On time domain, the resource region capable of transmission/reception of SA may be followed by a resource region capable of transmitting/receiving data related to a resource region capable of transmission/reception of a corresponding SA. Each of the transmitting terminals is capable of selecting a resource to transmit it SA from the resource region capable of transmitting/receiving SA signals.

A first method of sharing data resources via scheduling assignment (SA) includes: implicitly relating SA resources of individual transmitting terminals to data resources according to a preset rule; decoding the SA signals in a receiving terminal; and informing the receiving terminal of a location of a data resource related to a corresponding SA from the location of a corresponding SA resource.

A second method of sharing data resources via scheduling assignment (SA) includes: explicitly informing a receiving terminal of a data resource related to SA signals of individual transmitting terminals; decoding the SA signals in the receiving terminal; and informing the receiving terminal of a location of a data resource related to a corresponding SA from the location of a corresponding SA resource.

DISCLOSURE OF INVENTION

Technical Problem

The present invention has been made to address the above problems and disadvantages, and to provide at least the advantages described below. Accordingly, in order to transmit control information required to efficiently support D2D communication in an D2D communication environment of a distribution resource allocation described above, without employing an additional signaling process, the present invention provides a method and apparatus for performing D2D communication using the control information, including a process of designing signals for transmitting the control information.

In order to efficiently support the sharing of data resources between transmitting and receiving terminals via SA in an D2D communication environment of a distribution resource allocation described above, the present invention further provides a method and apparatus for performing D2D communication using information regarding the required data resource, including a process of designing signals for transmitting the information regarding the required data resource.

This section, technical problem, is merely intended to provide a few aspects of the present invention. It should be understood that the features and advantages of the present invention are not limited to those in the foregoing description, and the other features and advantages not described above will become more apparent from the following description.

Solution to Problem

In accordance with an aspect of the present invention, a device-to-device (D2D) communication method of a transmitting terminal includes: determining whether transmission data corresponds to the last transmission data; creating, when transmission data is the last transmission data, a first channel sensing signal containing information indicating that transmission data is the last transmission data; and transmitting the transmission data and the first channel sensing signal.

Preferably, when transmission data is not the last transmission data, the method may further include: creating a second channel sensing signal containing information indicating that the transmission data is not the last transmission data; and transmitting the transmission data and the second channel sensing signal.

Preferably, the method may further include: determining whether transmission data is for a voice service; creating, when transmission data is for a voice service, a third channel sensing signal containing information indicating that transmission data is for a voice service; and transmitting the transmission data and the third channel sensing signal.

Preferably, the method may further include: determining whether transmission data is for a data service; creating, when the transmission data is for a data service but not the last transmission data, a fourth channel sensing signal containing information indicating that transmission data is for a data service; and transmitting the transmission data and the fourth channel sensing signal.

In accordance with another aspect of the present invention, a device-to-device (D2D) communication method of a receiving terminal includes: detecting a channel sensing signal containing a condition as to whether data received from a transmitting terminal corresponds to the last transmission data of the transmitting terminal; determining whether a next communication resource is available, using the channel sensing signal; and performing transmission of the data and the channel sensing signal when a next communication resource is available.

Preferably, the transmission of the data and the channel sensing signal may include: setting a random back-off time when a next communication resource is available; performing a channel sensing during the back-off time; and performing transmission of the data and the channel sensing signal when a next communication resource is available after the channel sensing.

Preferably, the determination as to whether a next communication resource is available may include: detecting a channel sensing signal containing a condition as to whether data received from the transmitting terminal is for a voice service or for a data service; and ascertaining that a next communication resource is available when the received data is for a voice service.

The method may further include: detecting information regarding Transport Block Size (TBS) of the received data, using the channel sensing signal.

In accordance with another aspect of the present invention, a device-to-device (D2D) communication method of a transmitting terminal includes: creating a channel sensing signal containing decoding-related information regarding a transmission packet; and transmitting the transmission packet and the channel sensing signal.

Preferably, the creation of a channel sensing signal may include: determining whether a transmission packet is the initial transmission packet; and creating, when a transmission packet is the initial transmission packet, a first channel sensing signal containing information indicating that the transmission packet is the initial transmission packet.

Preferably, the creation of a channel sensing signal may include: creating, when a transmission packet is not the initial transmission packet, a second channel sensing signal containing information indicating that the transmission packet is not the initial transmission packet.

Preferably, the first channel sensing signal may further include information regarding Modulation and Coding Scheme (MCS) used in the transmitting terminal.

Preferably, the creation of a channel sensing signal may include: creating a channel sensing signal containing an Incremental Redundancy (IR) version of the transmission packet.

In accordance with another aspect of the present invention, a device-to-device (D2D) communication method of a receiving terminal includes: detecting a channel sensing signal containing decoding-related information regarding a packet received from a transmitting terminal; and decoding the received packet, using the channel sensing signal.

Preferably, the decoding of the received packet may include: detecting a channel sensing signal containing a condition as to whether the packet received from the transmitting terminal corresponds to the initial transmission packet; determining whether the received packet corresponds to the initial transmission packet, using the channel sensing signal; and decoding the received packet and packets successively received thereafter when the received packet corresponds to the initial transmission packet.

Preferably, the decoding of the received packet may further include: omitting the decoding of the received packet when the received packet is not the initial transmission packet.

Preferably, the decoding of the received packet may further include: detecting a channel sensing signal containing IR version information regarding the packet received from the transmitting terminal; and decoding the received packet, using the IR version.

In accordance with another aspect of the present invention, a device-to-device (D2D) communication method of a transmitting terminal includes: creating a channel sensing signal containing resource allocation information; and transmitting data and the channel sensing signal via a transmission resource of a size according to the resource allocation information.

Preferably, the size of the resource of the channel sensing signal is identical to that of the transmission resource.

Preferably, the channel sensing signal may include information related to the size of the transmission resource.

In accordance with another aspect of the present invention, a device-to-device (D2D) communication method of a receiving terminal includes: detecting a channel sensing signal from a transmitting terminal, using a preset resource allocation condition; and detecting, when the detection of a channel sensing signal is successful, the size of a transmission resource of the transmitting terminal, using the preset resource allocation condition.

Preferably, the preset resource allocation condition may include a condition that the resource size of the channel sensing signal is identical to that of the transmission resource.

Preferably, the preset resource allocation condition may include a size of the transmission resource.

In accordance with another aspect of the present invention, a transmitting terminal for supporting device-to-device (D2D) communication includes: a communication unit for communicating with other terminals; and a controller for: determining whether transmission data corresponds to the last transmission data; creating, when transmission data is the last transmission data, a first channel sensing signal containing information indicating that transmission data is the last transmission data and transmitting the transmission data and the first channel sensing signal.

In accordance with another aspect of the present invention, a receiving terminal for supporting device-to-device (D2D) communication includes: a communication unit for communicating with other terminals, and a controller for: detecting a channel sensing signal containing a condition as to whether data received from a transmitting terminal corresponds to the last transmission data of the transmitting terminal; determining whether a next communication resource is available, using the channel sensing signal; and performing transmission of the data and the channel sensing signal when a next communication resource is available.

In accordance with another aspect of the present invention, a transmitting terminal for supporting device-to-device (D2D) communication includes: a communication unit for communicating with other terminals; and a controller for: determining whether a transmission packet is the initial transmission packet; creating, when a transmission packet is the initial transmission packet, a first channel sensing signal containing information indicating that a transmission packet is the initial transmission packet; and transmitting the transmission data and the first channel sensing signal.

In accordance with another aspect of the present invention, a receiving terminal for supporting device-to-device (D2D) communication includes: a communication unit for communicating with other terminals; and a controller for: detecting a channel sensing signal containing a condition as to whether a packet received from a transmitting terminal corresponds to the initial transmission packet; determining whether the received packet corresponds to the initial transmission packet, using the channel sensing signal; and decoding the received packet and packets successively received thereafter when the received packet is the initial transmission packet. In accordance with another aspect of the present invention, a transmitting terminal for supporting device-to-device (D2D) communication includes: a communication unit for communicating with other terminals; and a controller for: creating a channel sensing signal containing resource allocation information; and controlling the transmission of the data and the channel sensing signal via a transmission resource of a size corresponding to the resource allocation information.

In accordance with another aspect of the present invention, a receiving terminal for supporting device-to-device (D2D) communication includes: a communication unit for communicating with other terminals; and a controller for: detecting a channel sensing signal from a transmitting terminal, using a preset resource allocation condition; and detecting, when the detection of a channel sensing signal is successful, the size of a transmission resource of the transmitting terminal, using the preset resource allocation condition.

In accordance with another aspect of the present invention, a device-to-device (D2D) communication method of a transmitting terminal includes: creating a scheduling assignment (SA) signal containing a condition as to whether to continue to occupy a transmittable/receivable resource of an SA signal next to a resource to be used for transmission/reception of an SA signal; and transmitting the SA signal.

In accordance with another aspect of the present invention, a device-to-device (D2D) communication method of a receiving terminal includes: receiving, from a transmitting terminal, a scheduling assignment (SA) signal by performing an energy sensing of a transmittable/receivable resource of an SA signal; detecting, from the SA signal, a condition as to whether the transmitting terminal continues to occupy a transmittable/receivable resource of an SA signal next to a transmittable/receivable resource of the SA signal; and determining whether the transmittable/receivable resource of the next SA signal is available, using the detected resource.

Preferably, the reception of an SA signal includes: receiving an SA signal via an SA monitoring.

Advantageous Effects of Invention

According to the process of designing channel sensing signals for transmitting control information required for D2D communication and the method and apparatus for performing D2D communication using the signals, in accordance with the present invention, the channel sensing signals inevitably required for a D2D function of a distribution resource allocation are used to transmit the control information, thereby allowing terminals to exchange control information with each other, without employing an additional control channel and signal.

According to an embodiment of the present invention, since signals are designed to transmit information regarding data resources required between transmitting and receiving terminals via SA, D2D communication can be performed using information regarding the required data resources.

It should be understood that the advantageous effects of the present invention are not limited to those in the foregoing description, and the other effects not described above will become more apparent from the following description.

BRIEF DESCRIPTION OF DRAWINGS

FIG. 13 shows block diagrams of a D2D transmitting terminal and a D2D receiving terminal according to an embodiment of the present invention.

MODE FOR THE INVENTION

Figure 1:
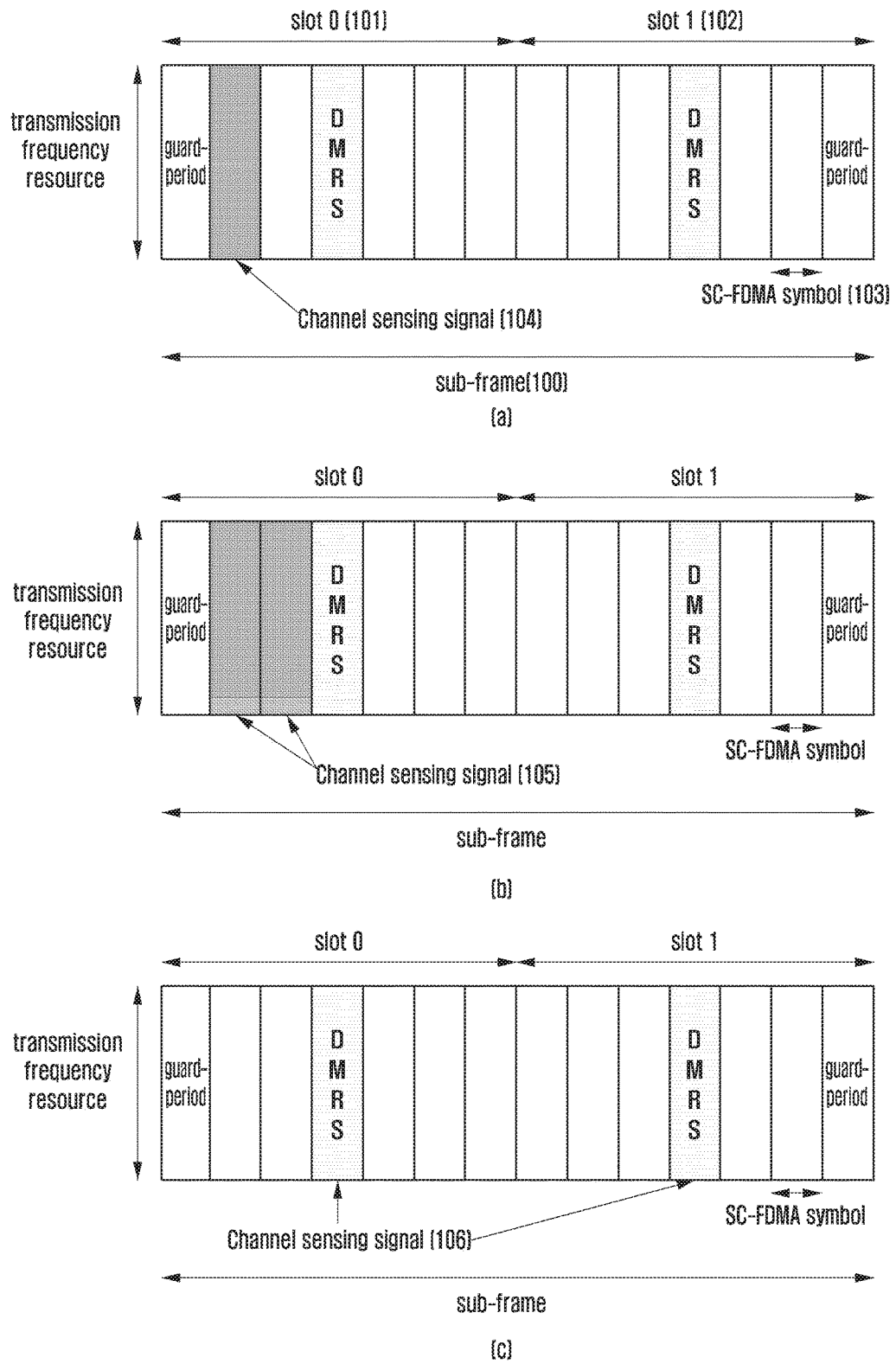
FIG. 1 illustrates diagrams showing describe examples of a channel sensing signal design according to an embodiment of the present invention.

Embodiments of the present invention are described in detail referring to the accompanying drawings. Detailed descriptions of well-known functions and structures incorporated herein may be omitted to avoid obscuring the subject matter of the invention. The terms or words described in this description and the claims should not be limited by a general or lexical meaning, instead should be analyzed as a meaning and a concept through which the inventor defines and describes the invention to the best of his/her ability, to comply with the idea of the invention.

Although the following embodiments will be described based on the 3GPP LTE standard, it will be appreciated to those skilled in the art that the subject matter of the present invention can also be applied to various types of communication systems which have the technical background and channel forms similar to those of the present invention, without departing from the scope and sprit of the present invention.

Hereinafter, a detailed description is provided regarding a method of designing discovery signals and a method and apparatus for allocating discovery signal resources and detecting discovery signals, according to embodiments of the present invention.

As described above, the channel sensing signal may be designed as a structure of a sequence format. As the channel sensing signal is set to have a sequence correlation, the channel sensing process can be simply performed. When the channel sensing signal is created, control information may be transmitted by the methods as follows.

A first method refers to a method including: setting a sequence set including a corresponding number of sequences required to represent control information; and mapping each sequence in the sequence set to one control information value. Therefore, the receiving terminal determines a sequence in the sequence set, corresponding to the detected channel sensing signal sequence, thereby recognizing a control information value indicated by the corresponding sequence.

A second method refers to a method applying a variable corresponding to control information to an input variable of a generating function used when a sequence is created.

For the sake of convenience, the embodiment is described based on an equation for generating LTE uplink Demodulation Reference Signal (DM RS), described in the following Equation 1.

$$r_{u,v}^{(\alpha)}(n)=e^{j*\alpha*n}\overline{r_{u,v}}(n), 0\le n\le M_{SC}^{RS} \quad \text{[Equation 1]}$$

In Equation 1, $r_{u,v}^{(\alpha)(n)}$ denotes the DM RS sequence, and refers to a base sequence $\overline{r_{u,v}}(n)$ having a cyclic shift value $\alpha$. $M_{SC}^{RS}$ denotes the length of DM RS sequence and is defined as a multiple of Resource Blocks (RBs) on the frequency domain. One RB is 12 sub-carriers. Since the sub-carrier spacing is 15 kHz, the frequency band occupied by one RB is 180 kHz. In LTE, the basic unit for resource allocation is RB. The value of $M_{SC}^{RS}$ may not exceed the uplink channel bandwidth. $\overline{r_{u,v}}(n)$ as a base sequence is divided into two groups, wherein u denotes a group index having values of 0 to 29 and v denotes a base sequence index in the group. The v has a base sequence of v=0 or v=–0, 1 per group, according to the length of DM RS sequence, i.e., the size on the frequency domain. The base sequence has a format of Zadoff-Chu (ZC) sequence.

In the embodiment, a variable corresponding to control information may employ a cyclic shift value $\alpha$ and a base sequence group index u. For example, when control information has two state values '0' or '1', the cyclic shift value $\alpha$ may be set in such a way that $\alpha$=0 and $\alpha$=1 correspond to state values '0' and '1' respectively. N is a particular cyclic shift value (not '0') in a range of cyclic shift value. In addition, the base sequence group index u may be set in a way that u=0 and u=15 correspond to state values '0' and '1' respectively. Alternatively, with extending the settings, available cyclic shift values are divided into two groups, so that one group and the other group corresponds to state values '0' and '1' respectively. Base sequence group indexes are divided into two groups, so that one group and the other group corresponds to state values '0' and '1' respectively. Alternatively, state values of control information may also be expressed by a combination of the two variables. Although the embodiment is described based on two state values of control information, it should be understood that the input variables described above may be used to express three or more state values of control information.

In another embodiment, it may employ an equation for generating LTE random access preamble sequence, described in the following Equation 2.

$$x_{u,v}(n)=x_u((n+C_v)\bmod N_{ZC}) \quad \text{[Equation 2]}$$

In equation 2, $x_u(n)$ denotes the $u^{th}$ root ZC sequence, $N_{ZC}$ denotes the length of a corresponding ZC sequence. $C_v$ denotes a cyclic shift value. Like the embodiment using the DM RS sequence described above, in order to express control information, the index u of root ZC sequence, the cyclic shift value $C_v$, or a combination thereof may be used as variables corresponding to control information.

A receiving terminal is capable of recognizing control information in such a way that it: takes correlations with sequences which can be generated, using the method described above in detecting a channel sensing signal; and ascertains that a control information state value corresponding to the sequence having the largest correlation has been received.

According to embodiments, for the sequence generating functions described above, in order to prevent a terminal from increasing in the complexity of channel sensing signal detection, values that can be assigned to the input values may be restricted to the number required to express the states of control information.

The embodiment to achieve the objectives described in the section of technical problem provides a method of transmitting channel sensing signals for D2D communication. The method includes: creating a channel sensing signal to be transmitted by a terminal, based on D2D communication-related control information; transmitting the crated channel sensing signal; and receiving, by a receiving terminal, the channel sensing signal and recognizing the D2D communication-related control information. The D2D communication-related control information may contain at least one of the following:

1) Information indicating a time that a radio resource used by a transmitting terminal will be empty 2) Setting information regarding a radio resource used by a transmitting terminal 3) Identification information regarding packets transmitted by a transmitting terminal 4) Information regarding services of a transmitting terminal 5) Information regarding resource allocation of a transmitting terminal 6) Information regarding modulation and coding scheme of a transmitting terminal 7) Information regarding priority of a transmitting terminal The embodiment according to the present invention to achieve the objectives described in the section of technical problem is a method of recognizing D2D communication-related information by a terminal receiving a channel sensing signal for D2D communication, including: recognizing, by a receiving terminal, a time when a current transmitting terminal empties a resource, based on a channel sensing signal; and performing a channel sensing process and a signal transmitting process when the transmitting terminal empties a corresponding resource.

The embodiment according to the present invention to achieve the objectives described in the section of technical problem is a method of recognizing D2D communication-related information by a terminal receiving a channel sensing signal for D2D communication, including: recognizing, by a receiving terminal, a type of a service transmitted by a current transmitting terminal, and a condition as to whether it is the last transmission, based on a channel sensing signal, and performing a channel sensing process and a signal transmitting process when the transmitting terminal empties a corresponding resource.

The embodiment according to the present invention to achieve the objectives described in the section of technical problem is a method of recognizing D2D communication-related information by a terminal receiving a channel sensing signal for D2D communication, including: recognizing, by a receiving terminal, a type of a service transmitted by a current transmitting terminal; and implicitly recognizing the size of transmitted information, based on the type of service.

The embodiment according to the present invention to achieve the objectives described in the section of technical problem is a method of recognizing D2D communication-related information by a terminal receiving a channel sensing signal for D2D communication, including: recognizing, by a receiving terminal, a setting of resources used by a current transmitting terminal, based on a channel sensing signal; and performing a channel sensing process and a signal transmitting process when the transmitting terminal does not use a corresponding resource.

The embodiment according to the present invention to achieve the objectives described in the section of technical problem is a method of recognizing D2D communication-related information by a terminal receiving a channel sensing signal for D2D communication, including: recognizing, by a receiving terminal, the initial transmission packet identification information and non-initial transmission packet identification information from a current transmitting terminal, based on a channel sensing signal; determining whether there is a packet that the receiving terminal has not normally received; leaving, when there is a packet that the receiving terminal has not normally received, the rest of the packets from the transmitting terminal, without decoding them; and decoding, when there is no packet that the receiving terminal has not normally received, the rest of the packets from the transmitting terminal.

The embodiment according to the present invention to achieve the objectives described in the section of technical problem is a method of recognizing D2D communication-related information by a terminal receiving a channel sensing signal for D2D communication, including: recognizing, by a receiving terminal, Incremental Redundancy (IR) version identification information regarding currently received packet, based on a channel sensing signal; and applying the IR version identification information to a decoding process.

The embodiment according to the present invention to achieve the objectives described in the section of technical problem is a method of recognizing D2D communication-related information by a terminal receiving a channel sensing signal for D2D communication, including: recognizing, by a receiving terminal, information regarding a frequency resource used by a transmitting terminal, based on a channel sensing signal; and decoding, by the receiving terminal, the transmitting terminal signals.

The embodiment according to the present invention to achieve the objectives described in the section of technical problem is a method of recognizing D2D communication-related information by a terminal receiving a channel sensing signal for D2D communication, including: recognizing, by a receiving terminal, information regarding a priority of a transmitting terminal, based on a channel sensing signal; and comparing, by the receiving terminal, the priority of a transmitting terminal with that of the receiving terminal.

The embodiment according to the present invention to achieve the objectives described in the section of technical problem is a method of recognizing D2D communication-related information by a terminal receiving a channel sensing signal for D2D communication, including: recognizing, by a receiving terminal, Modulation and Coding Scheme (MCS) used by a transmitting terminal, based on a channel sensing signal; and decoding, by the receiving terminal, the transmitting terminal signals.

According to an embodiment of the present invention to achieve the objectives described in the section of technical problem, a D2D communication method of a transmitting terminal is implemented in such a way as to contain, in a scheduling assignment (SA) signal, information indicating whether a resource currently used for transmission of a corresponding SA signal will continue to be used in the next SA transmittable/receivable resource region, or information indicating the number of times that the currently used resource will continue to be used during a cycle of an SA transmittable/receivable resource region. Using the method, receiving terminals may discover whether a resource occupied by SA signals, received when the next SA transmittable/receivable resource region appears, will be used, from the currently received SA signals. Therefore, the receiving terminals may use the information when a terminal that will transmit the next SA signal selects a resource.

When transmitting terminal and receiving terminal share the transmitting terminal data resource information with each other via SA, a terminal planning to transmit SA signals via an SA transmittable/receivable resource is capable of determining its SA transmittable resource via an energy sensing or SA monitoring process. In this case, the energy sensing process needs to be performed before a corresponding SA transmittable/receivable resource region. For the SA monitoring process, the terminal is capable of attempting to receive an SA signal in the SA transmittable/receivable resource.

When a data resource and an SA resource of individual transmitting terminals are implicitly related to each other according to a pre-defined rule as described above, a terminal planning to transmit SA signals may apply a result of an energy sensing process to its SA transmission resource selection with respect to a data transmission/reception region before an SA transmittable/receivable resource region. However, if the terminal does not employing the method, it may not precisely discover whether a resource that has been occupied by SA and data can be used in a current SA transmittable/receivable resource region. When SA of individual transmitting terminals explicitly indicates the related data resource, a channel sensing process may be performed for a previous SA transmittable/receivable resource region, not a data region; however, if the terminal does not employing the method, it may not precisely discover whether a resource that has been occupied by SA and data can be used in a current SA transmittable/receivable resource region.

When a method of indicating an SA related-data resource via SA of individual transmitting terminals employs a method of indicating a data resource explicitly related to SA by SA, at least one particular value of the values of information related to data resources including SA may indicate that a resource to which a corresponding SA is assigned has been related to a data resource according to a pre-defined rule. That is, the method of indicating an SA related-data resource may be implemented with using both an explicitly SA indicating method and an implicitly SA indicating method.

In the following description, embodiments of the present invention are explained in detail.

FIG. 1 illustrates diagrams showing describe examples of a channel sensing signal design according to an embodiment of the present invention. In the embodiment, it is assumed that the frame structure is an LTE uplink.

Referring to FIG. 1, one subframe 100 has 1 ms in length of time and is divided into two slots, slot 0 (indicated by reference number 101) and slot 1 (indicated by reference number 102). Each slot has seven Single Carrier—Frequency Division Multiple Access (SC-FDMA) symbols 103. It is assumed that the first SC-FDMA symbol and the last SC-FDMA symbol of a sub-frame are used as Guard Period (GP). GP is set for switching between transmission and reception in a terminal, considering the half-duplex in D2D communication. The SC-FDMA symbol in the center of each slot transmits a reference signal that a terminal uses for modulation over a frequency domain, i.e., Demodulation Reference Signal (DM RS).

Diagram (a) of FIG. 1 is a first example showing a sub-frame using a channel sensing signal of an RS structure or a preamble which, which differs from the DM RS. According to embodiments, the channel sensing signal 104 may be transmitted via an SC-FDMA symbol next to the GP of slot 0.

Diagram (b) of FIG. 1 is a second example showing a sub-frame that uses a channel sensing signal of an RS structure or a preamble which, which differs from the DM RS and, and that transmits a channel sensing signal 105 over the two SC-FDMA symbols between the TP of slot 0 and the DM RS. According to embodiments, the channel sensing signal 105 may be designed: to have preambles or RS sequences according to SC-FDMA symbols, individual, respectively, or to have a length of one preamble or RS sequence so that it can be transmitted via two SC-FDMA symbols.

The second example shown in diagram (b) of FIG. 1 may be used to include a number of control information items in a channel sensing signal. For example, the channel sensing signal sequence of one SC-FDMA symbol may be used to indicate a service type of data transmitted along therewith, and the channel sensing signal sequence of the other SC-FDMA symbol may be used to indicate the priority of the current transmitting terminal. According to embodiments, when a sequence is created using one channel sensing signal sequence over the length of two SC-FDMA symbol, control information corresponding to a combination of the service type of data and the priority of a transmitting terminal can be detected by variables, such as a cyclic shift value, etc. Diagram (b) of FIG. 1 shows an example where the section of the channel sensing signal is configured over two SC-FDMA symbols. However, it should be understood that the present invention is not limited to the example. For example, according to embodiments, various combinations of control information can be transmitted via a number of SC-FDMA symbols.

Diagram (c) of FIG. 1 is a third example showing a sub-frame with a channel sensing signal 106 of a structure to be used as the DM RS. In this case, the channel sensing signal 106 is a DM RS sequence located at the center between slots 1 and 1. A receiving terminal: takes correlations with DM RS sequences that can be used in detecting a channel sensing signal; ascertains that a control information state value corresponding to the sequence having the largest correlation has been received, estimates a channel state based on a corresponding sequence; and uses the channel state to demodulate received signals. As another example, the sequences of DM RS of slot 0 and DM RS of slot 1 may be used to inform different control information items, respectively. The third example may affect the decoding performance of a receiving terminal.

It should be understood that the location and number of SC-FDMA symbols of a channel sensing signal may not be limited to the examples described above. For example, according to embodiments, SC-FDMA symbols of a channel sensing signal may be transmitted via any slot 0 or slot 1.

Figure 2:
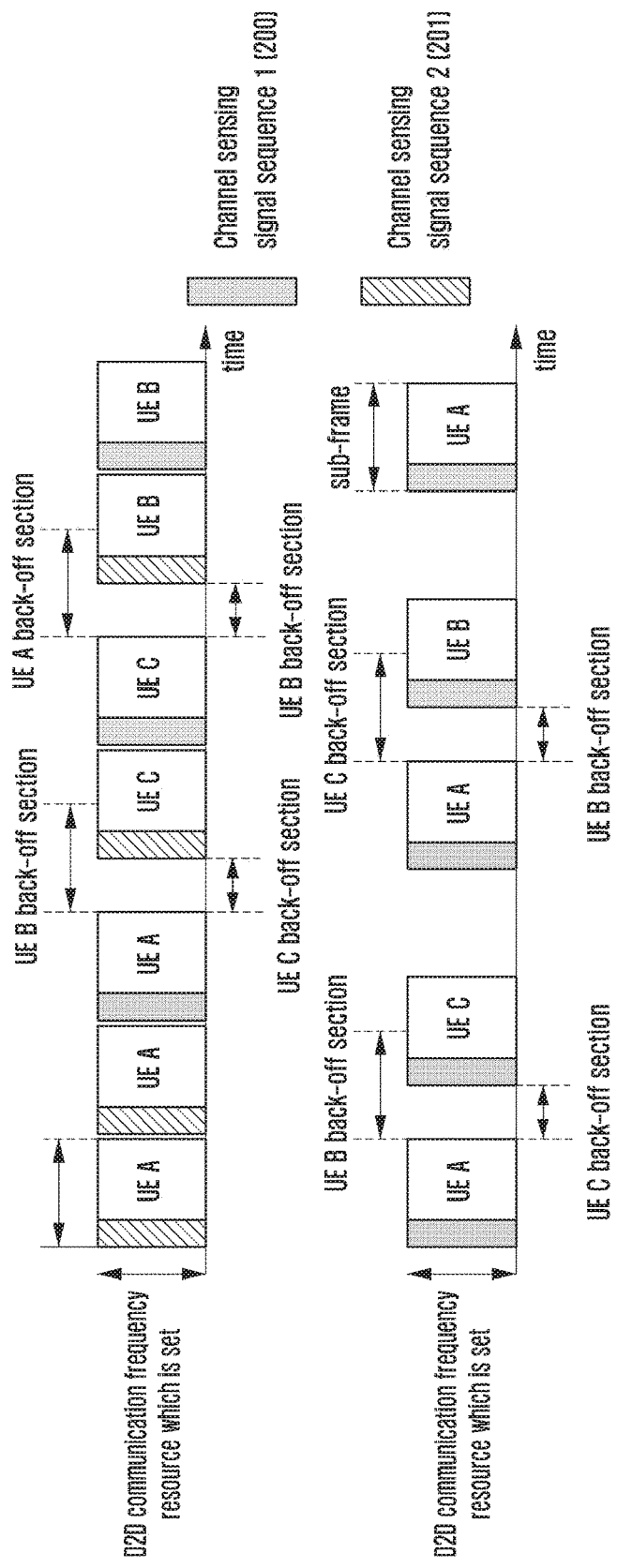
FIG. 2 illustrates diagrams that describe a method of performing D2D communication when a channel sensing signal contains information as to whether it is the last transmission according to an embodiment of the present invention.

FIG. 2 illustrates diagrams that describe a method of performing D2D communication when a channel sensing signal contains information as to whether it is the last transmission according to an embodiment of the present invention.

The embodiment is described based on two types of sensing signal sequence, channel sensing signal sequences 1 and 2. Channel sensing signal sequence 1 (indicated by reference number 200) is defined as the last transmission sub-frame of the sub-frames transmitted by a current transmitting terminal. Channel sensing signal sequence 2 (indicated by reference number 201) is defined as one of the sub-frame transmitted by a current transmitting terminal, indicating that it will continue transmitting data. In the embodiment, it is assumed that D2D terminals transmit data via the overall frequency domain set for D2D communication resources.

Referring to FIG. 2, the top of the diagram shows a first example of a D2D communication method when terminals A, B, and C (corresponding to UE A, UE B, UE C, respectively in FIG. 2) use data services via D2D communication. It is assumed that terminal A uses a D2D communication resource and terminals A, B, and C have data to be transmitted.

When using a data service generally, terminal A transmits its data via successive sub-frames. When transmitting the last sub-frame of the successive sub-frames, terminal A transmits channel sensing signal sequence 1 along therewith, thereby informing other terminals that it does not use the other sub-frames after the last sub-frame. After that, terminal A transmits channel sensing signal sequence 2 via other sub-frames except for the last sub-frame, thereby informing other terminals that it will use sub-frames after the sequence 2. This makes other terminals (i.e., terminal B and terminal C) performing a channel sensing process recognize a time when the currently used D2D communication resources are empty. Therefore, terminals which have data to be transmitted may monitor corresponding D2D communication resources during a back-off section from the end of a sub-frame where channel sensing signal sequence 1 is detected. When a terminal ascertains that a corresponding resource has been empty, it transmits data via the resource. According to embodiments, in order to assign an equal, data transmission change to terminals, the length of a back-off section may randomly be set in each of the terminals, each back-off. The length of back-off section may be less than or equal to a sub-frame unit, or may be a number of sub-frames.

Referring to the first example of FIG. 2, since terminal C has a smaller length of back-off section than terminal B at a time point that transmission of terminal A is ended, it transmits data earlier than terminal B. When the length of back-off section is randomly set at another back-off start time point that terminal C ends the transmission, terminal B has a smaller length of back-off section than terminal A, thereby performing transmission of data.

Through the method according to the embodiment, terminals can recognize a time when data transmission is ended, without employing an additional channel for the transmission of control information regarding a data transmission length.

Referring to FIG. 2, the bottom of the diagram shows a second example of a D2D communication method when terminals A, B, and C (corresponding to UE A, UE B, UE C, respectively in FIG. 2) use voice services via D2D communication. It is assumed that terminal A uses a D2D communication resource.

In voice services, a setting of resources to be used by individual terminals is determined in semi-persistent scheduling mode. For example, when terminal A transmits voice data via one sub-frame, it uses sub-frames after its cycle length. Therefore, when using voice services, since a terminal uses sub-frames not successively but with a specific cycle, other terminals may use sub-frames between the specific cycles.

Referring to the second example of FIG. 2, terminal A transmits its voice data along with channel sensing signal sequence 1 via one sub-frame. Terminal A uses channel sensing signal sequence 1 and this is because the voice data transmitted by terminal A does not use successive subframes as the first example of FIG. 2. That is, after using one frame, the voice data transmitted by terminal A does not use sub-frames until the next cycle. When terminal B and terminal C detect the channel sensing signal sequence 1 and ascertain that the next sub-frame has not been used, they perform a random back-off process and a voice data transmission, as the first example of FIG. 2.

For example, since terminal C has a smaller length of back-off section than terminal B at a time point that transmission of terminal A is ended, it transmit data earlier than terminal B. When terminal A ascertains that the next transmission cycle of voice data arrives, it may transmit its voice data along with channel sensing signal sequence 1 via one sub-frame. When the length of back-off section is randomly set at a time point that the transmission of terminal A is ended, terminal B has a smaller length of back-off section than terminal C, thereby performing transmission of voice data.

Another method according to the embodiment may be implemented in such a way as to: predefine a number of resource settings for supporting voice services and inform other terminals a resource setting in use via a channel sensing signal sequence. In this case, since other terminals can estimate a resource that the current transmitting terminal will use later, they transmit their signals via other resources excluding the resource estimated to be in use, thereby reducing a conflict of transmitting terminal resources.

Although the present disclosure described an example a data service and another example using a voice service separately, it should be understood that the present invention may also be applied to an environment simultaneously using a data service and a voice service. In this case, according to embodiments, the maximum number of successively transmittable sub-frames for data service may be set to be less than the sub-frame cycle set for voice service.

Figure 3:
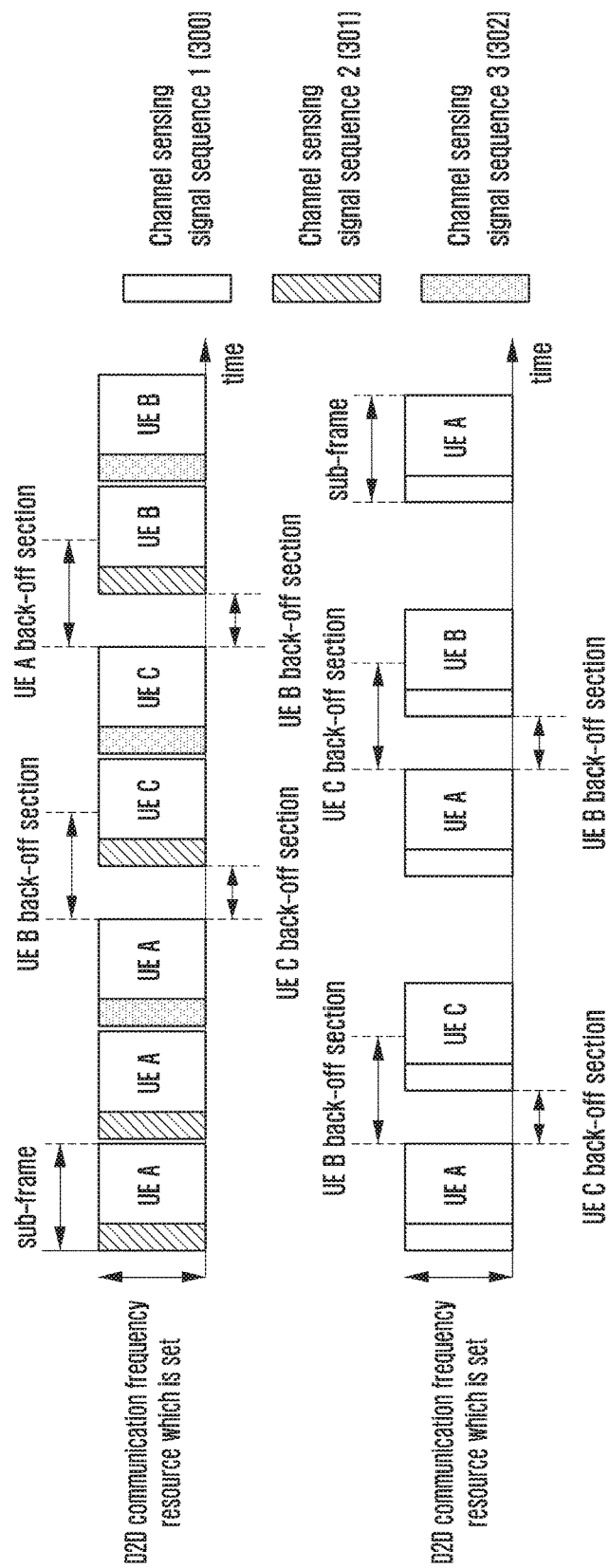
FIG. 3 illustrates diagrams that describe a method of performing D2D communication when a channel sensing signal contains a type of service and information as to whether it is the last transmission according to an embodiment of the present invention.

FIG. 3 illustrates diagrams that describe a method of performing D2D communication when a channel sensing signal contains a type of service and information as to whether it is the last transmission according to an embodiment of the present invention.

The embodiment is described based on three types of sensing signal sequence, channel sensing signal sequences 1, 2 and 3. Channel sensing signal sequence 1 (indicated by reference number 300) is defined to indicate that a sub-frame transmitted by a current transmitting terminal provides a voice service. Channel sensing signal sequence 2 (indicated by reference number 301) is defined to indicate that a sub-frame transmitted by a current transmitting terminal provides a data service. Channel sensing signal sequence 3 (indicated by reference number 303) is defined to indicate that a sub-frame transmitted by a current transmitting terminal is the last transmission sub-frame. In the embodiment, it is assumed that D2D terminals transmit data via the overall frequency domain set for D2D communication resources.

Referring to FIG. 3, the top of the diagram shows a first example of a D2D communication method when terminals A, B, and C (corresponding to UE A, UE B, UE C, respectively in FIG. 3) use data services via D2D communication. It is assumed that terminal A uses a D2D communication resource and terminals A, B, and C have data to be transmitted. The first example of FIG. 3 is similar to that of FIG. 2 in terms of the operations of terminals A, B, and C. However, there is a difference between the first example of FIG. 3 and that of FIG. 2 as follows: when the sub-frame transmitted by a terminal is not the last sub-frame, a channel sensing signal sequence transmitted along with the sub-frame indicates a state using successive sub-frames and a service type of data transmitted via the current sub-frame.

This method may be useful when QoS required according to types of service differs from each other. For example, when QoS for a voice service and a data service differs from each other, Transport Block Size (TBS) may be defined differently according to the types of services. In this case, a receiving terminal may implicitly discover TBS of currently received data from a channel sensing signal sequence information the service type of data, without an additional control information channel or signal.

For example, referring to the first example of FIG. 3, terminal A transmits its data via successive sub-frames. When transmitting the last sub-frame of the successive sub-frames, terminal A transmits channel sensing signal sequence 3 (302) along therewith, thereby informing other terminals that it does not use the other sub-frames after the last sub-frame.

After that, terminal A transmits channel sensing signal sequence 2 (302) via other sub-frames except for the last sub-frame, thereby informing other terminals (i.e., terminal B and terminal C) that the sub-frames transmitted by terminal A after the sequence 2 are for a data service. When the length of back-off section is randomly set at a time point that the transmission of terminal A is ended, terminal C has a smaller length of back-off section than terminal B, thereby transmitting data earlier than terminal B. Since its detailed description was already explained above referring to FIG. 2, it will be omitted bellows.

Referring to FIG. 3, the bottom of the diagram shows a second example of a D2D communication method when terminals A, B, and C (corresponding to UE A, UE B. UE C, respectively in FIG. 3) use voice services via D2D communication. It is assumed that terminal A uses a D2D communication resource and terminals A. B, and C have data to be transmitted. The second example of FIG. 3 is similar to that of FIG. 2 in terms of the operations of terminals A, B. C. However, there is a difference between the second example of FIG. 3 and that of FIG. 2 as follows: a channel sensing signal sequence indicates not a condition as to whether the sub-frame is the last sub-frame but a condition that a sub-frame transmitted by a terminal is a type of voice service. The information indicating a type of voice service may include two implicit information items transmitted to a receiving terminal. One implicit information item is information indicating that a current transmitting terminal will not use successive sub-frames and the other item is TBS information regarding currently received voice data.

Although the present disclosure described an example a data service and another example using a voice service separately, it should be understood that the present invention may also be applied to an environment simultaneously using a data service and a voice service. In this case, according to embodiments, the maximum number of successively transmittable sub-frames for data service may be set to be less than the sub-frame cycle set for voice service.

Figure 4:
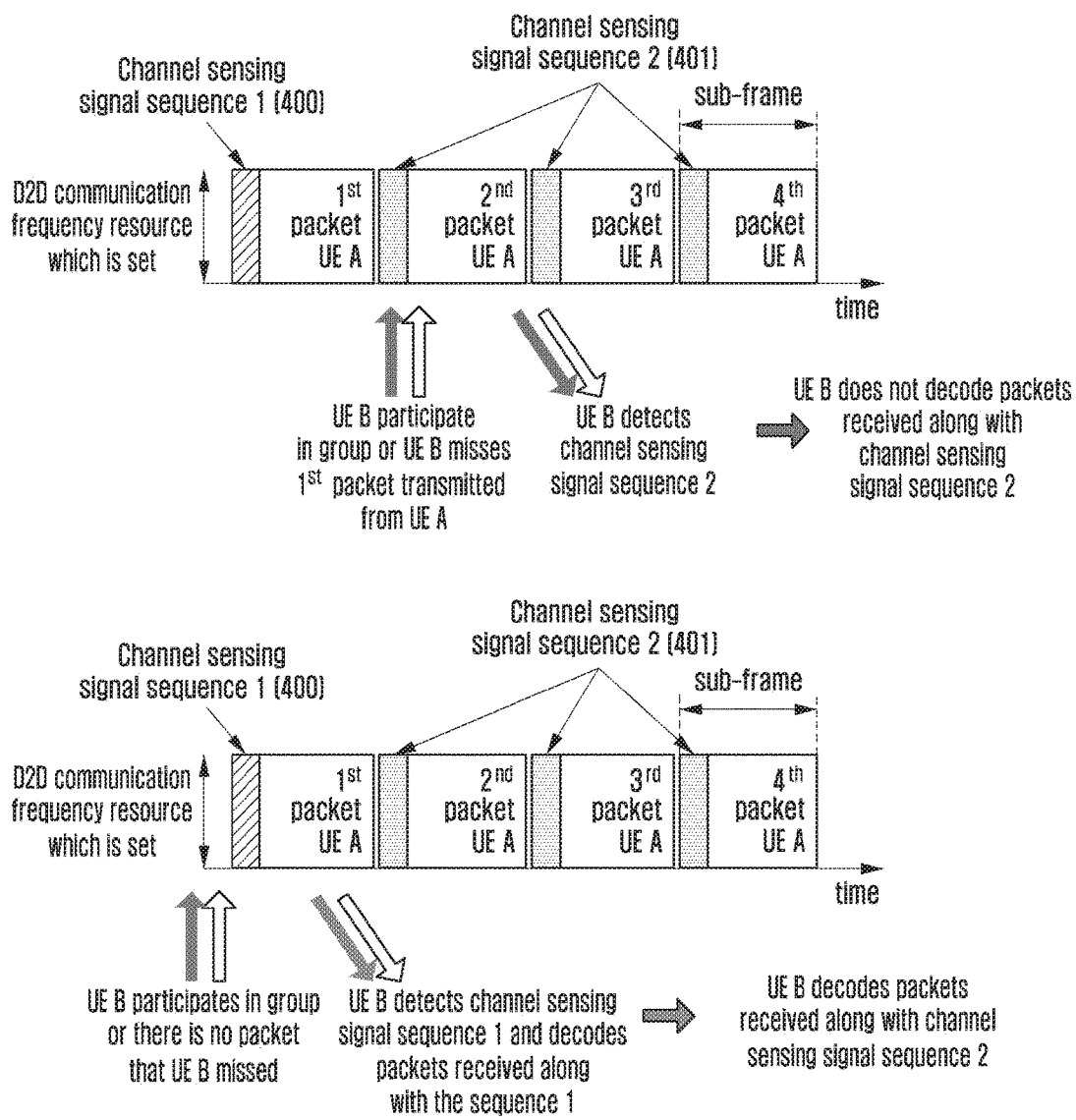
FIG. 4 illustrates diagrams that describe an example of a method of performing D2D communication when a channel sensing signal contains transmission packet identification information according to an embodiment of the present invention.

FIG. 4 illustrates diagrams that describe an example of a method of performing D2D communication when a channel sensing signal contains transmission packet identification information according to an embodiment of the present invention.

The embodiment is described based on two types of sensing signal sequence, channel sensing signal sequences 1 and 2. Channel sensing signal sequence 1 (indicated by reference number 400) is defined to indicate that a packet transmitted by a current transmitting terminal is the initial transmission. Channel sensing signal sequence 2 (indicated by reference number 401) is defined to indicate that a packet transmitted by a current transmitting terminal is not the initial transmission. In the embodiment, it is assumed that D2D terminals transmit data via the overall frequency domain set for D2D communication resources.

Referring to FIG. 4, the top of the diagram shows a first example of an operation of terminal B (corresponding to UE B in FIG. 4) when terminal B participates in a new D2D communication group or terminal B does not detect a packet that current transmitting terminal A (corresponding to UE A in FIG. 4) has transmitted. The terminal B may receive the second packet and thereafter that terminal A is transmitting. The terminal B is capable of receiving a channel sensing signal sequence 2 (indicated by reference number 401), along with the second packet transmitted by terminal A. The terminal B is capable of recognizing that the currently received packet is not a packet by the initial transmission, by detecting channel sensing signal sequence 2 (401). Since channel sensing signal sequence 2 (401) means a presence of a packet which has been lost before a packet that terminal B receives, terminal B does not decode packets where channel sensing signal sequence 2 (401) is detected.

Referring to FIG. 4, the bottom of the diagram shows a second example of an operation of terminal B (corresponding to UE B in FIG. 4) when terminal B does not completely detect packets that current transmitting terminal A (corresponding to UE A in FIG. 4) is transmitting. The terminal B may receive the first packet and thereafter that terminal A is transmitting. The terminal B is capable of receiving a channel sensing signal sequence 1 (indicated by reference number 400), along with the first packet transmitted by terminal A. The terminal B is capable of recognizing that the currently received packet is a packet by the initial transmission, by detecting channel sensing signal sequence 1 (400).

Since channel sensing signal sequence 1 (400) means there has been no lost packet, terminal B decodes packets where channel sensing signal sequence 2 (401) is detected.

In a situation where the entire packet can be normally decoded only after individual transmission packets for a data service are completely decoded, the embodiment enables a receiving terminal to recognize a condition as to whether a packet has been lost, without employing an additional channel for transmitting control information, thereby preventing the terminal from performing an unnecessary decoding process.

Figure 5:
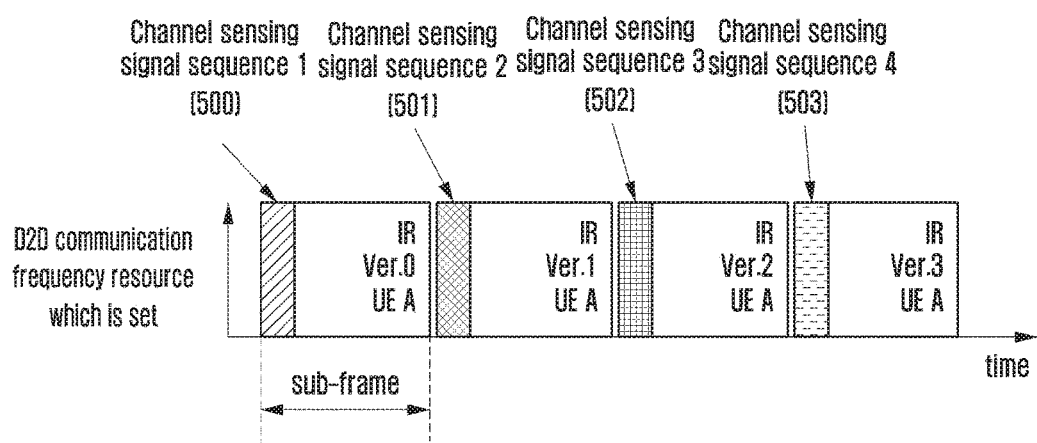
FIG. 5 illustrates diagrams that describe another example of a method of performing D2D communication when a channel sensing signal contains transmission packet identification information according to an embodiment the present invention.

FIG. 5 illustrates diagrams that describe another example of a method of performing D2D communication when a channel sensing signal contains transmission packet identification information according to an embodiment the present invention.

In the embodiment, when N types of IR version for a corresponding packet are transmitted through N sub-frames in transmitting packets via D2D communication, N types of channel sensing signal sequence are defined. For the sake of convenience, it is assumed that N is 4. Therefore, channel sensing signal sequence 1 (500) means that a current sub-frame transmits IR version 0; channel sensing signal sequence 2 (501) means that a current sub-frame transmits IR version 1; channel sensing signal sequence 3 (502) means that a current sub-frame transmits IR version 2; and channel sensing signal sequence 4 (503) means that a current sub-frame transmits IR version 3. In the embodiment, it is assumed that D2D terminals transmit data via the overall frequency domain set for D2D communication resources.

Referring to FIG. 5, when terminal A (corresponding UE A in FIG. 5) transmits its data, it may transmit IR versions that differ from each other, via each of the four successive sub-frames, instead of a sub-frame. In this case, a receiving terminal identifies an IR version of a currently received sub-frame, by detecting a channel sensing signal sequence, and decodes a corresponding packet, based on the IR version. In order to guarantee the reception detection performance in an environment where closed loop feedback such as HARQ ACK/NACK cannot be used, a number of IR versions are bundled into successive sub-frames, the embodiment can provide useful control information to a decoding process of a receiving terminal, without employing an addition control channel.

Figure 6:
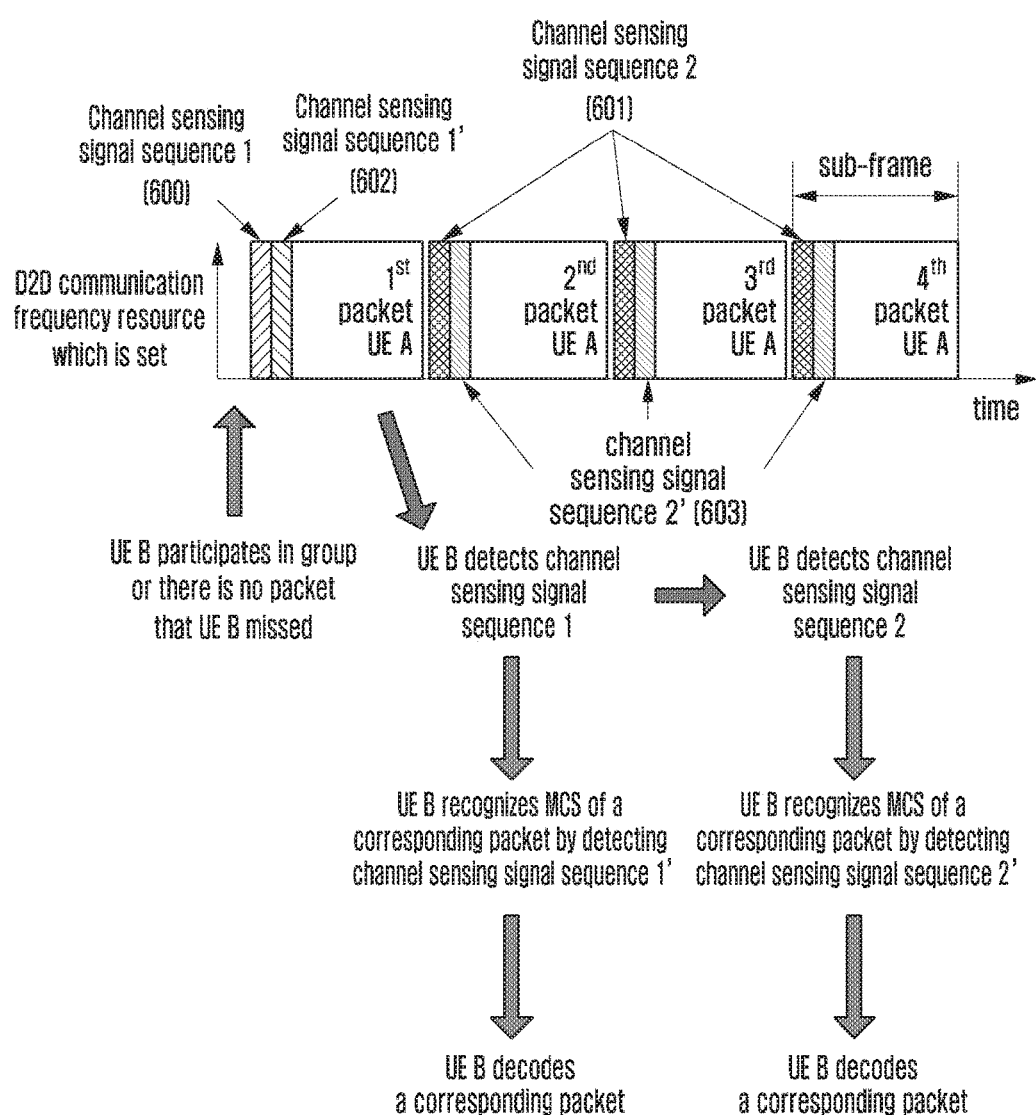
FIG. 6 illustrates a diagram that describes a method of performing D2D communication when a channel sensing signal contains transmission packet identification information and MCS information according to an embodiment of the present invention.

FIG. 6 illustrates a diagram that describes a method of performing D2D communication when a channel sensing signal contains transmission packet identification information and MCS information according to an embodiment of the present invention.

The embodiment is described based on four types of sensing signal sequence, channel sensing signal sequences 1, 2, 1' and 2'. Channel sensing signal sequence 1 (indicated by reference number 600) is defined to indicate that a packet transmitted by a current transmitting terminal is the initial transmission. Channel sensing signal sequence 2 (indicated by reference number 601) is defined to indicate that a packet transmitted by a current transmitting terminal is not the initial transmission. Channel sensing signal sequence 1' (indicated by reference number 602) is defined as MCS level 0. Channel sensing signal sequence 2' (indicated by reference number 603) is defined as MCS level 1. In the embodiment, it is assumed that D2D terminals transmit data via the overall frequency domain set for D2D communication resources, and available MCS levels are level 0 and level 1.

Referring to FIG. 6, when terminal B (corresponding to UE B in FIG. 6) receives the first packet and thereafter that terminal A (corresponding to UE A in FIG. 6) is transmitting, it detects channel sensing signal sequence 1 (600), thereby recognizing that there is no packet that has been lost. When the terminal B detects channel sensing signal sequence 1' (602), it recognizes that the MCS level of a currently received packet is 0, thereby performing a decoding process based on the MCS level. After that, when terminal B detects channel sensing signal sequence 2 (601) from a signal received from terminal A, it may decode subframes of the received signal, assuming that the MCS level of packets, realized from channel sensing signal sequence 2' (603), is 1. In FIG. 6, for the sake of convenience, the initial transmission sub-frame uses MCS level of 0 and successive sub-frames use MCS level of 1; however, it should be understood that MCS levels of 0 and 1 may be applied to any sub-frames with limitation.

Although it is not shown, in a state where terminal B receive a packet that is not a packet by the initial transmission of terminal A, like the first example of FIG. 4, when terminal B receives channel sensing signal sequence 2 (601), it may realizes a presence of a packet that has been lost before its received packet. Therefore, terminal B may not decode packets where channel sensing signal sequence 2 (601) is detected.

The embodiment can inform a receiving terminal of a number of types of control information, using channel sensing signal sequences, without employing a number of control channels.

Figure 7:
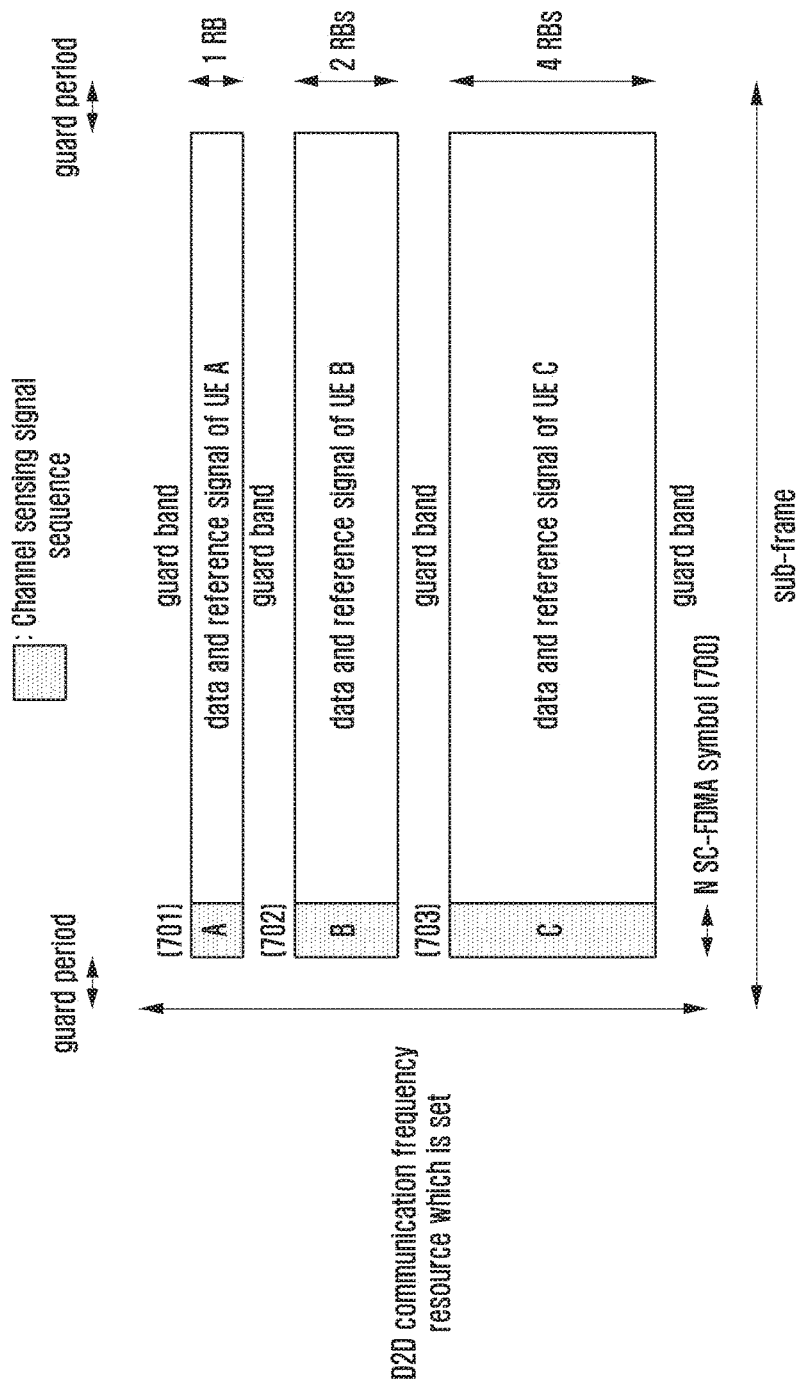
FIG. 7 illustrates a diagram showing an example of a frame structure when a channel sensing signal contains information regarding transmission frequency resources according to an embodiment of the present invention.

FIG. 7 illustrates a diagram showing an example of a frame structure when a channel sensing signal contains information regarding transmission frequency resources according to an embodiment of the present invention.

In the embodiment, it is assumed that a number of terminals share D2D communication frequency resources set in sub-frames in Frequency Division Multiplex (FDM). It is also assumed that the number of successive RBs that terminals can use is set to 1, 2, or 4, and individual terminals transmit data via a frequency resource of a size corresponding to one of the three settings.

Referring to FIG. 7, the first section of N SC-FDMA symbols 700 in a sub-frame may be used as a channel sensing signal region. The size of a frequency resource occupied by a channel sensing signal is identical to that of the frequency resource that a transmitting terminal uses for data transmission. That is, when a terminal sets a frequency resource to a size corresponding to one of the number of RBs, 1, 2, and 4, to transmit data, the channel sensing signal is also designed in such a way that the sequence has a length occupying 1, 2, or 4 RBs on the frequency domain. Therefore, according to the embodiment, a channel sensing signal indicates a frequency resource for data transmission via the length of a specific sequence.

A receiving terminal attempts to perform blind detection on the channel sensing signal region. As shown in FIG. 7, when it is assumed that three terminals A, B, and C are in FDM in one sub-frame, occupying RBs of 1, 2, and 4, respectively, a receiving terminal takes a correlation on a channel sensing signal region with a channel sensing sequence (701) of 1 RB, and thus detects a channel sensing signal of terminal A. In this case, the receiving terminal may recognize that data of terminal A is transmitted to a region of 1 RB, based on the detected RB location. In addition, a receiving terminal takes a correlation on a channel sensing signal region with a channel sensing sequence (702) of 2 RBs, and thus detects a channel sensing signal of terminal B. In this case, the receiving terminal may recognize that data of terminal B is transmitted to a region of 2 RBs, based on the detected RB location. Similarly, a receiving terminal takes a correlation on a channel sensing signal region with a channel sensing sequence (703) of 4 RBs, and thus detects a channel sensing signal of terminal C and the corresponding data transmission frequency resource. The embodiment can indicate frequency resource allocating information obtained from a channel sensing signal, without employing an additional control channel.

Figure 8:
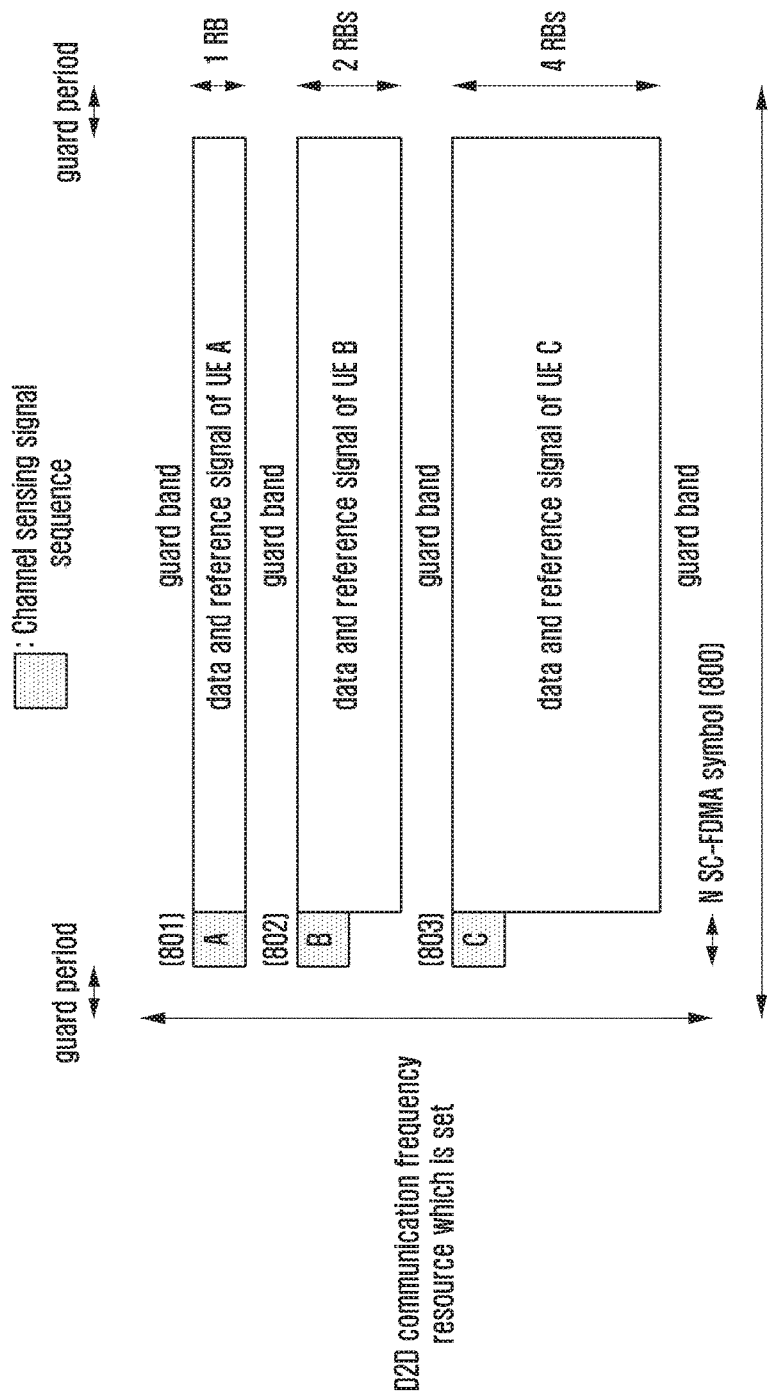
FIG. 8 illustrates a diagram showing another example of a frame structure when a channel sensing signal contains information regarding transmission frequency resources according to an embodiment of the present invention.

FIG. 8 illustrates a diagram showing another example of a frame structure when a channel sensing signal contains information regarding transmission frequency resources according to an embodiment of the present invention.

In the embodiment, it is assumed that a number of terminals share D2D communication frequency resources set in sub-frames in FDM. It is also assumed that the number of successive RBs that terminals can use is set to 1, 2, or 4, and individual terminals transmit data via a frequency resource of a size corresponding to one of the three settings.

Referring to FIG. 8, the first section of N SC-FDMA symbols 800 in a sub-frame may be used as a channel sensing signal region. The sizes of frequency resource occupied by channel sensing signals are identical to each other. The embodiment is described, based on three channel sensing signal sequences 1, 2, and 3. Channel sensing signal sequence 1 (801) is defined to indicate that the size of transmission data by a corresponding terminal is 1 RB; channel sensing signal sequence 2 (802) is defined to indicate that the size of transmission data by a corresponding terminal is 2 RBs; and channel sensing signal sequence 3 (803) is defined to indicate that the size of transmission data by a corresponding terminal is 4 RBs.

A receiving terminal attempts to perform blind detection on the channel sensing signal region. As shown in FIG. 8, when it is assumed that three terminals A, B, and C are in FDM in one sub-frame, occupying RBs of 1, 2, and 4, respectively, a receiving terminal takes a correlation on a channel sensing signal region with a channel sensing sequence 1 (801), and thus detects a channel sensing signal of terminal A. In this case, the receiving terminal may recognize that data of terminal A is transmitted to a region of 1 RB, based on the detected RB location. In addition, a receiving terminal takes a correlation on a channel sensing signal region with a channel sensing sequence 2 (802), and thus detects a channel sensing signal of terminal B. In this case, the receiving terminal may recognize that data of terminal B is transmitted to a region of 2 RBs, based on the detected RB location. Similarly, a receiving terminal takes a correlation on a channel sensing signal region with a channel sensing sequence 3 (803), and thus detects a channel sensing signal of terminal C and the corresponding data transmission frequency resource. The embodiment can indicate frequency resource allocating information obtained from a channel sensing signal, without employing an additional control channel.

Figure 9:
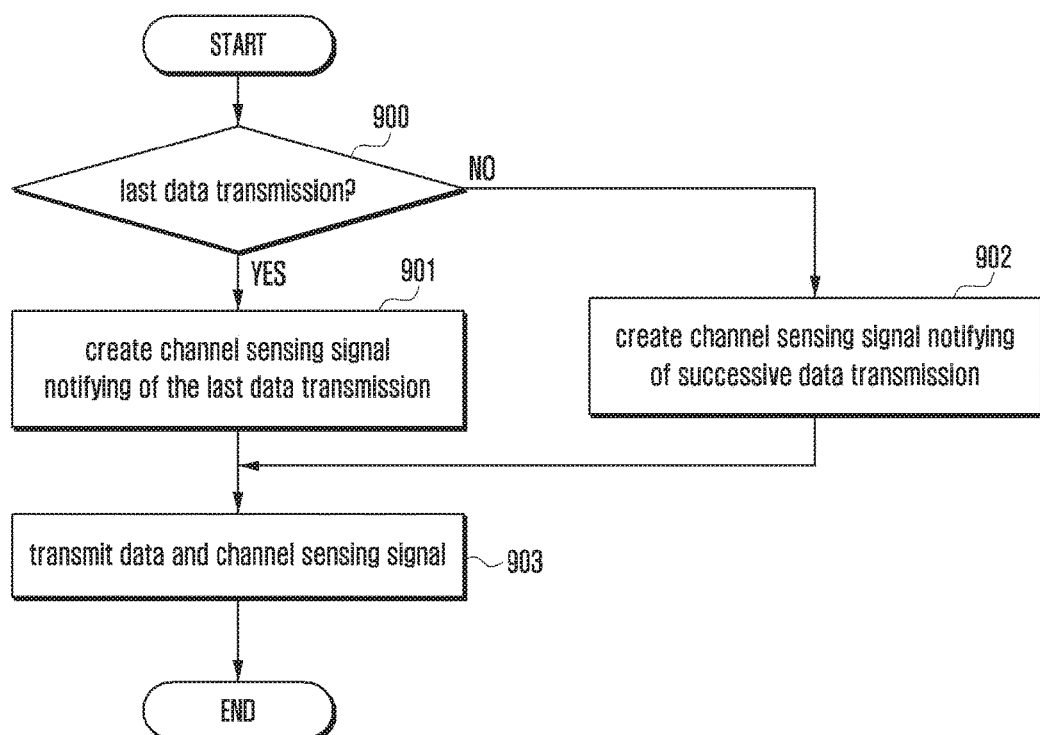
FIG. 9 is a flowchart that describes a method of performing operations in a transmitting terminal when a channel sensing signal contains information as to whether it is the last transmission according to an embodiment of the present invention.

FIG. 9 is a flowchart that describes a method of performing operations in a transmitting terminal when a channel sensing signal contains information as to whether it is the last transmission according to an embodiment of the present invention.

Referring to FIG. 9, the transmitting terminal determines whether its currently transmitting sub-frame is the last data transmission in operation 900. When the transmitting terminal ascertains that its currently transmitting sub-frame is the last data transmission in operation 900, it is capable of creating a channel sensing signal notifying the last data transmission in operation 901. On the other hand, when the transmitting terminal ascertains that its currently transmitting sub-frame is not the last data transmission in operation 900, it is capable of creating a channel sensing signal notifying that the sub-frame is not the last data transmission, i.e., successive sub-frames are used in operation 902.

After creating a channel sensing signal in operation 901 or 902, the transmitting terminal is capable of transmitting the created channel sensing signal along with data in operation 903.

Figure 10:
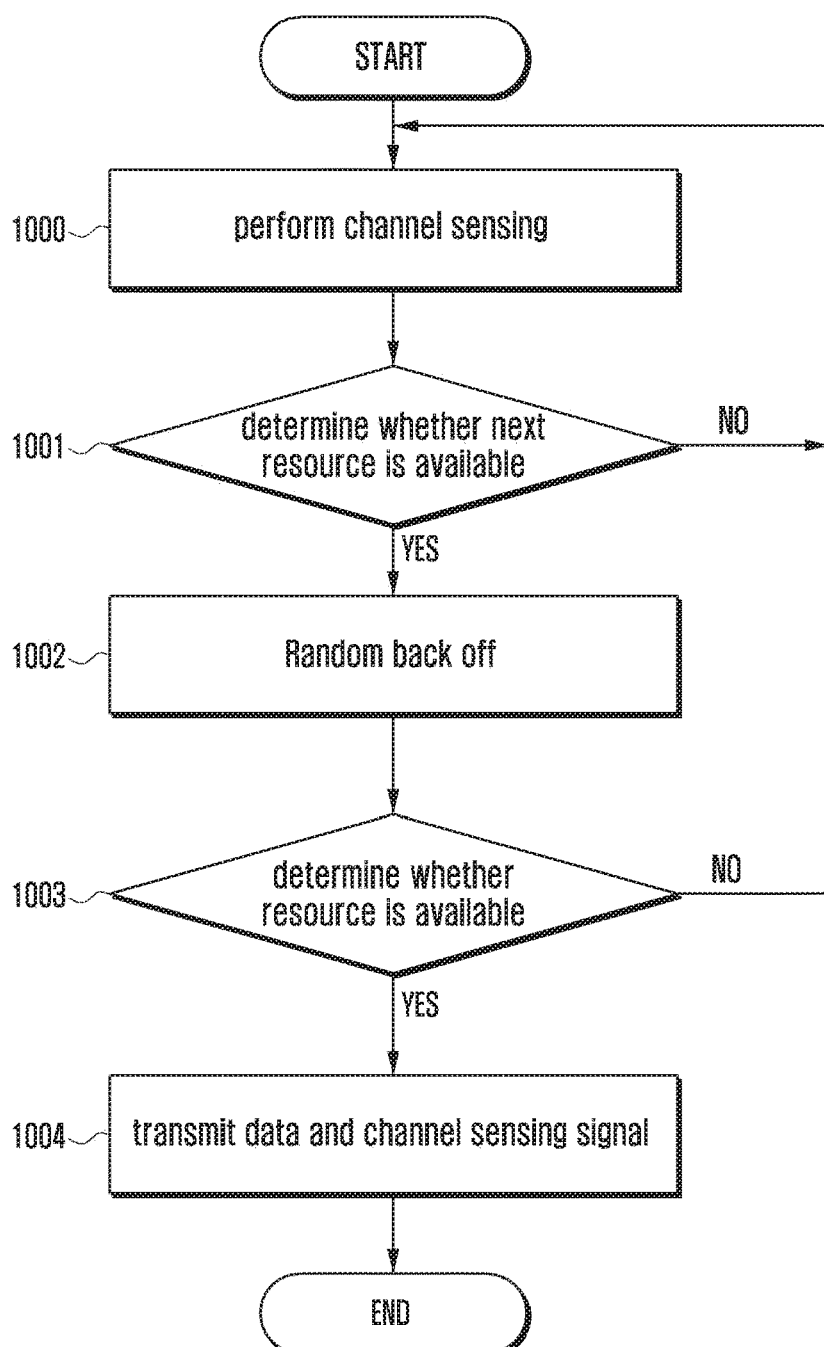
FIG. 10 is a flowchart that describes a method of performing operations in a receiving terminal that needs to perform the data transmission when a channel sensing signal contains information as to whether it is the last transmission according to an embodiment of the present invention.

FIG. 10 is a flowchart that describes a method of performing operations in a receiving terminal that needs to perform the data transmission when a channel sensing signal contains information as to whether it is the last transmission according to an embodiment of the present invention.

Referring to FIG. 10, a receiving terminal that needs data transmission performs a channel sensing process to attempt to detect a channel sensing signal in operation 1000. The receiving terminal detects a channel sensing signal transmitted from a current transmitting terminal and determines whether the next resource, i.e., the next sub-frame, is available, based on the detected channel sensing signal in operation 1001. When the receiving terminal ascertains that the next resource is available in operation 1001, it performs a random back-off process from the end of the current sub-frame to perform a channel sensing process during the randomly set back-off time in operation 1002. After that, when the receiving terminal ascertains that a corresponding resource is available, based on the result of the channel sensing process, in operation 1003, it is capable of transmitting its channel sensing signal along with data in operation 1004. On the other hand, when the receiving terminal ascertains that the next resource is not available, based on the detection of the channel sensing signal in operation 1001, it returns to and performs a channel sensing process in operation 1000. When the receiving terminal ascertains that a corresponding resource is not available, based on the result of the random back-off process, in operation 1003, it returns to and performs a channel sensing process in operation 1000.

Figure 11:
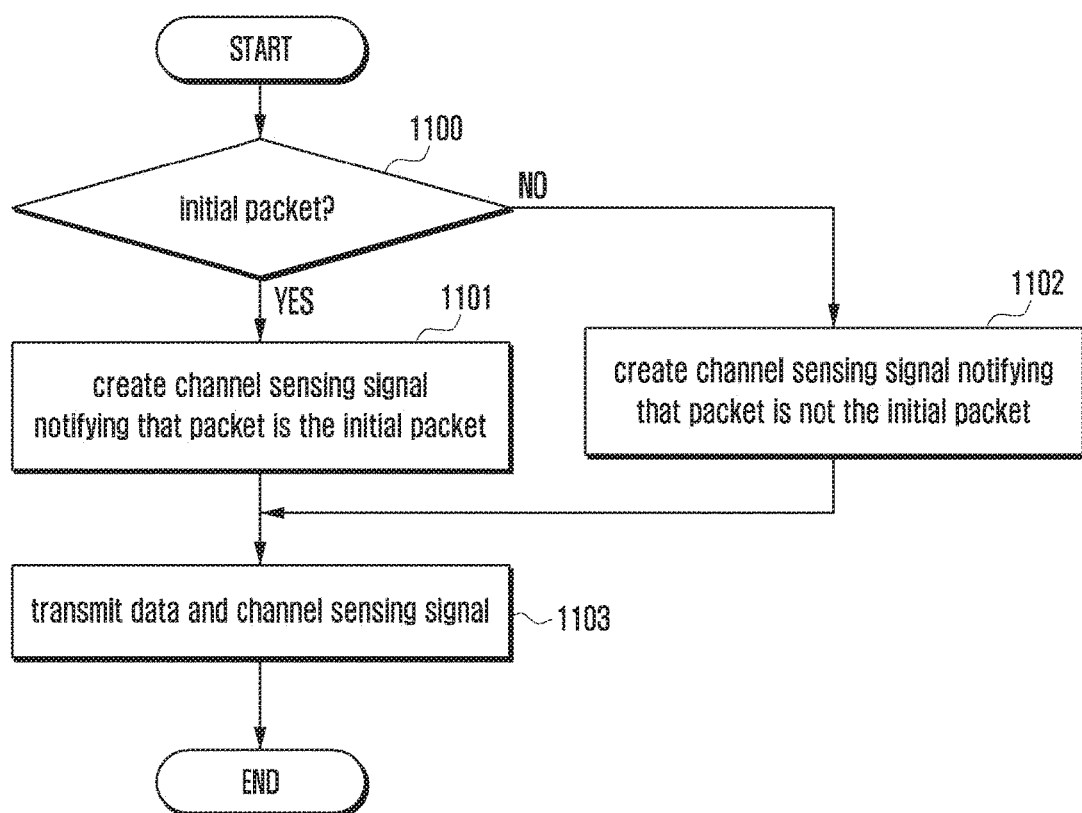
FIG. 11 is a flowchart that describes a method of performing operations in a transmitting terminal when a channel sensing signal contains transmission packet identification information according to an embodiment of the present invention.

FIG. 11 is a flowchart that describes a method of performing operations in a transmitting terminal when a channel sensing signal contains transmission packet identification information according to an embodiment of the present invention.

Referring to FIG. 11, the transmitting terminal determines whether its currently transmitting packet is a packet by the initial transmission in operation 1100. When the transmitting terminal ascertains that its currently transmitting packet is a packet by the initial transmission in operation 1100, it is capable of creating a channel sensing signal notifying that the current transmitting packet is a packet by the initial transmission in operation 1101. On the other hand, when the transmitting terminal ascertains that its currently transmitting packet is not a packet by the initial transmission in operation 1100, it is capable of creating a channel sensing signal notifying that the current transmitting packet is not a packet by the initial transmission in operation 1102. After creating a channel sensing signal in operation 1101 or 1102, the transmitting terminal is capable of transmitting the created channel sensing signal along with data in operation 1103.

Figure 12:
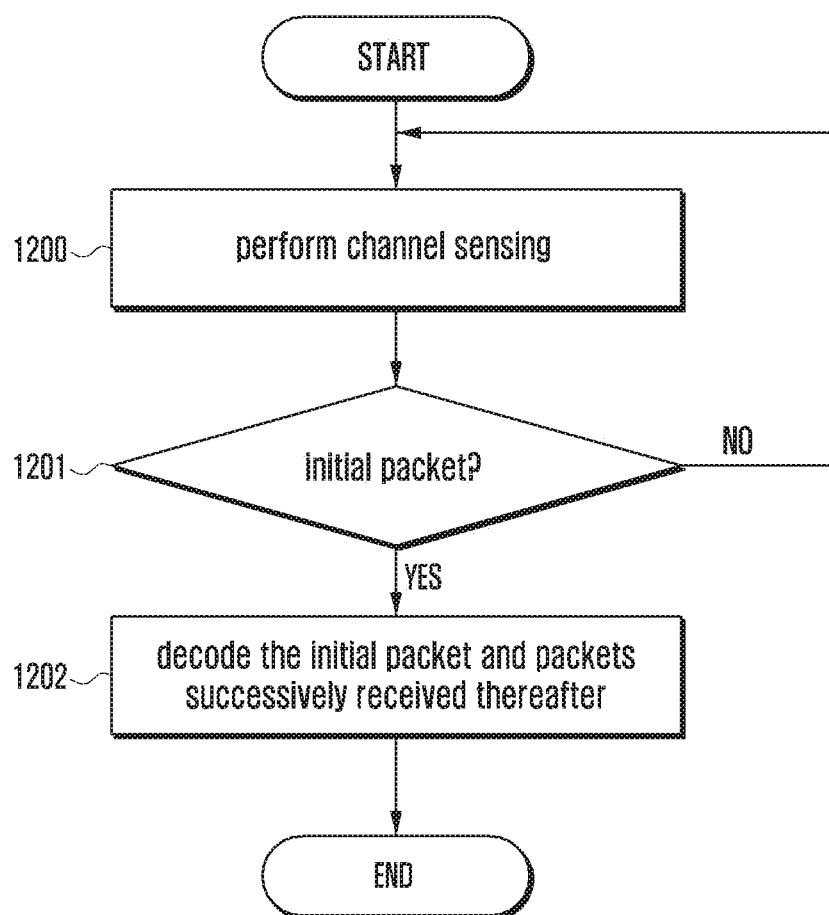
FIG. 12 is a flowchart that describes a method of performing operations in a receiving terminal when a channel sensing signal contains transmission packet identification information according to an embodiment of the present invention.

FIG. 12 is a flowchart that describes a method of performing operations in a receiving terminal when a channel sensing signal contains transmission packet identification information according to an embodiment of the present invention.

Referring to FIG. 12, the receiving terminal performs a channel sensing process to attempt to detect a channel sensing signal in operation 1200. The receiving terminal determines whether a corresponding, received packet is a packet by the initial transmission by a current transmitting terminal, based on the detection of a channel sensing signal from the current transmitting terminal, in operation 1201. When the receiving terminal ascertains that the received packet is a packet by the initial transmission in operation 1201, which means that there is no lost packet, it thus decodes the currently received packet by the initial transmission and packets successively received thereafter, in operation 1202. On the other hand, when the receiving terminal ascertains that the received packet is not a packet by the initial transmission in operation 1201, which means that there is a packet that has been lost, it returns to operation 1200, without decoding the currently received packet and packets successively received thereafter.

FIG. 13 shows block diagrams of a D2D transmitting terminal and a D2D receiving terminal according to an embodiment of the present invention. More specifically, diagram (a) of FIG. 13 is a block diagram showing a transmitting terminal and diagram (b) of FIG. 13 is a block diagram showing a receiving terminal.

Referring to diagram (a) of FIG. 13, the transmitting terminal is capable of including a controller 1300 and a communication unit 1302. The controller 1300 controls the transmitting terminal to perform operations for the embodiments described above. For example, the controller 1300 sets control information related to the transmission of current data. The controller 1300 is capable of creating a channel sensing signal sequence based on the control information.

According to embodiments, the transmitting terminal may further include a channel sensing signal creating unit 1301. The channel sensing signal creating unit 1301 is capable of creating channel sensing signal sequences based on control information from the controller 1300.

The communication unit 1302 performs transmission/reception of signals according to operations of the embodiments described above. For example, the communication unit 1302 carries the created channel sensing signal sequence on a channel sensing signal transmission resource, multiplexes it with a data channel crated based on the control information, and transmits them together.

According to embodiments, the communication unit 1302 may be configured to include a D2D transmitting unit. The D2D transmitting unit carries the created channel sensing signal sequence on a channel sensing signal transmission resource, multiplexes it with a data channel created based on the control information, and transmits them together.

Referring to diagram (b) of FIG. 13, the receiving terminal is capable of including a controller 1305 and communication units 1303 and 1307. According to embodiments, the communication units 1303 and 1307 may be configured to be a D2D receiving unit and a D2D transmitting unit, respectively. The controller 1305 controls the receiving terminal to perform operations for the embodiments described above. For example, the controller 1305 controls the D2D receiving unit 1303 to: receive D2D signals from the transmitting terminal; separate channel sensing signals from the D2D signals; detect channel sensing signals; and precisely decode the received data based on the channel sensing signals. The controller 1305 creates a channel sensing signal sequence, and the D2D transmitting unit carries the created channel sensing signal sequence on a channel sensing signal transmission resource, multiplexes it with a data channel crated based on the control information, and transmits them together.

The communication units 1303 and 1307 perform reception/transmission of signals according to operations of the embodiments described above. For example, the communication unit is capable of receiving D2D signals from the transmitting terminal.

The communication unit is also capable of carrying the created channel sensing signal sequence on a channel sensing signal transmission resource, multiplexing it with a data channel crated based on the control information, and transmitting them together.

According to embodiments, the receiving terminal may further include a channel sensing signal detecting unit 1304 and a channel sensing signal creating unit 1306. The D2D receiving unit 1303 receives D2D signals from the transmitting terminal and separates a channel sensing signal therefrom. The channel sensing signal detecting unit 1304 detects the channel sensing signal to obtain control information and transfers the obtained control information to the controller 1305. The controller 1305 controls the D2D receiving unit 1303 to precisely decode the received data based on the control information.

When a corresponding receiving terminal has data to be transmitted, the controller 1305 determines whether it transmits data, based on the control information obtained from the channel sensing signal detecting unit 1304, and controls the channel sensing signal creating unit 1306 and the D2D transmitting unit 1307 to transmit the data and the channel sensing signal. After that, the channel sensing signal creating unit 1306 creates a channel sensing signal sequence based on the control information, and the D2D transmitting unit 1307 carries the created channel sensing signal sequence on a channel sensing signal transmission resource, multiplexes it with a data channel created based on the control information, and transmits them together.

Figure 14A:
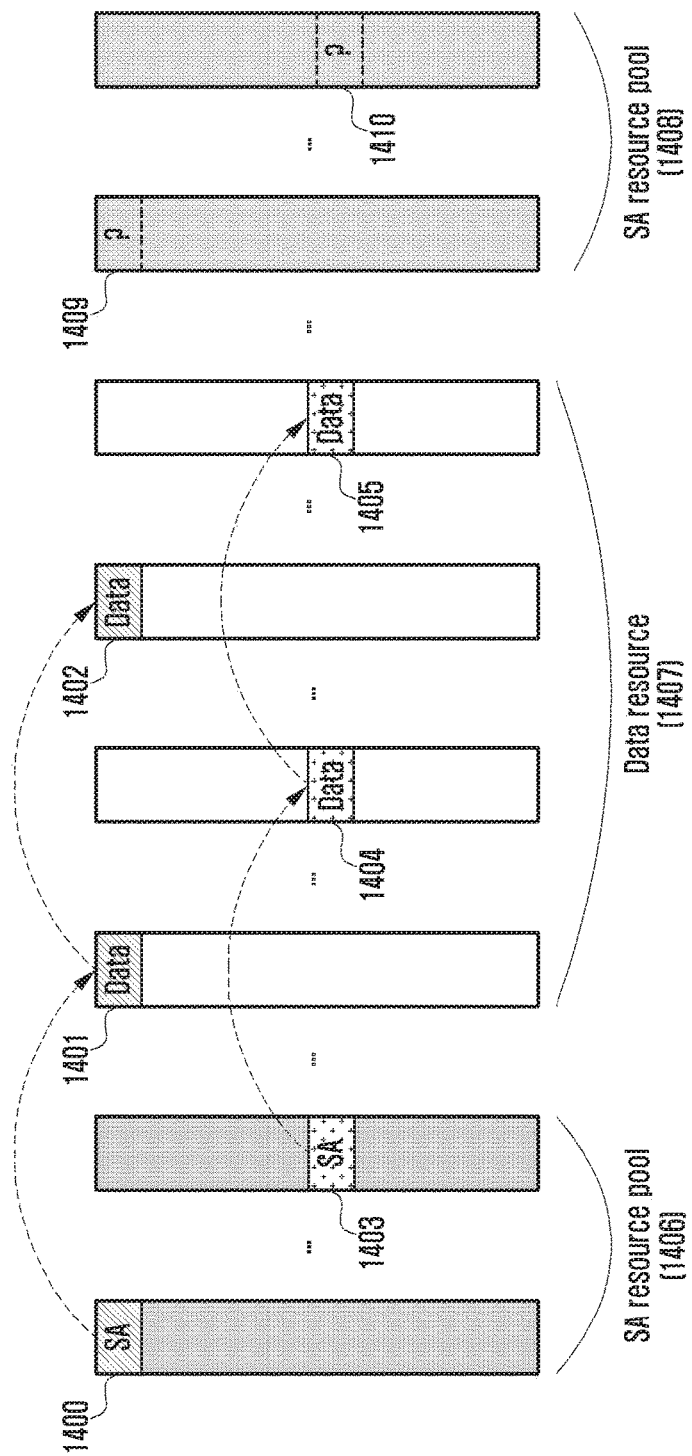
FIGS. 14a to 14c show diagrams that describe a method of performing D2D communication when a scheduling assignment (SA) signal contains resource occupation information according to an embodiment of the present invention.
Figure 14B:
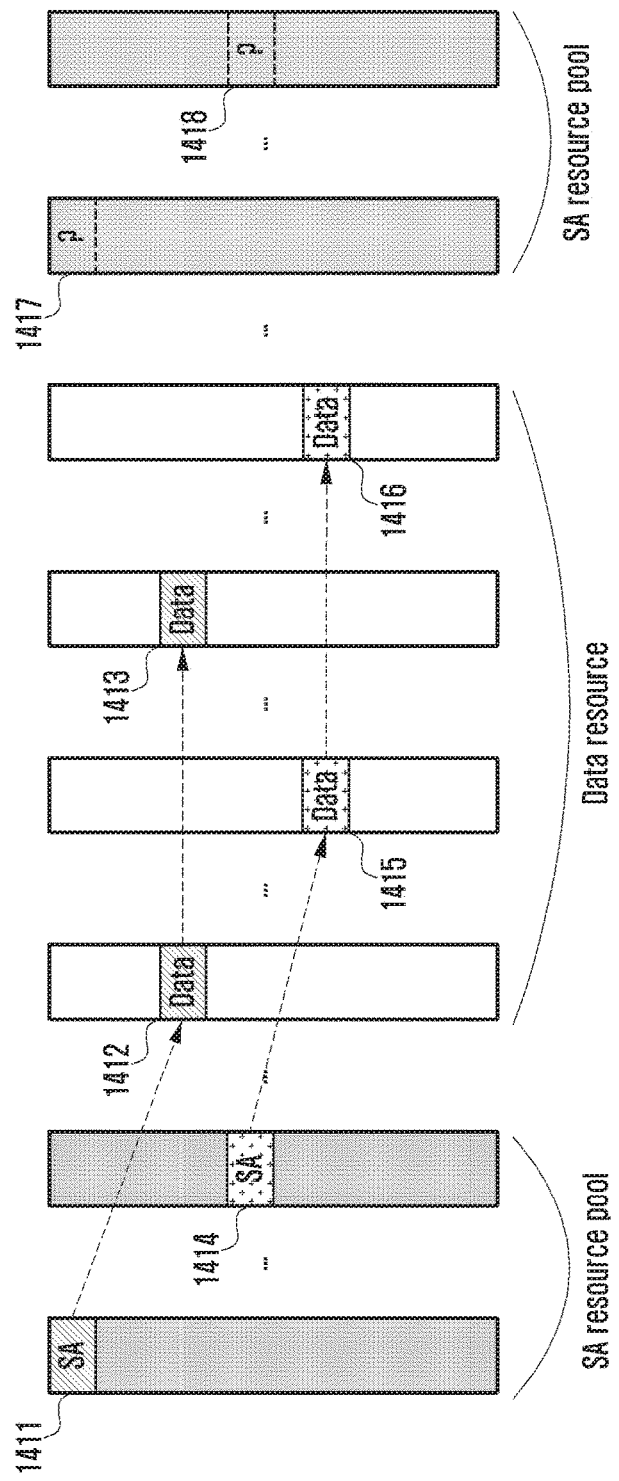
Figure 14C:
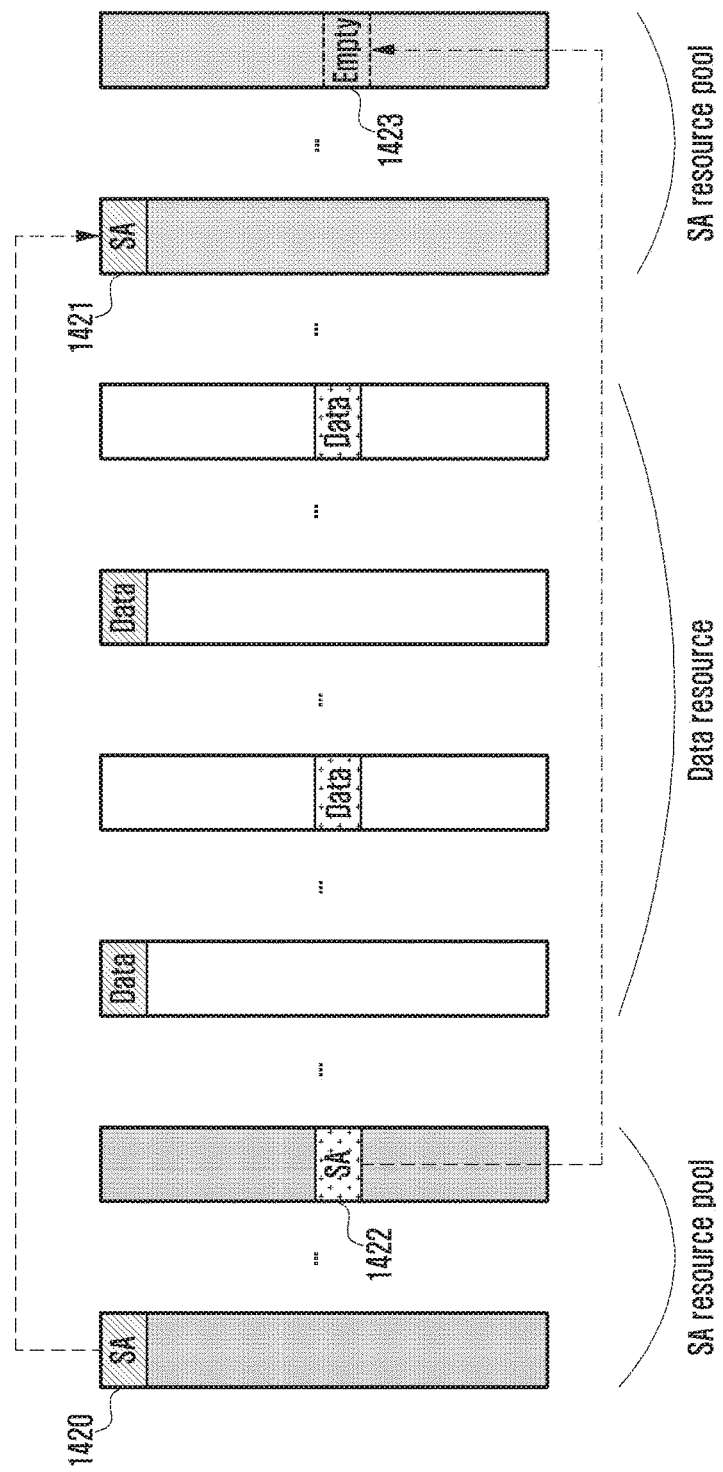

FIGS. 14a to 14c show diagrams that describe a method of performing D2D communication when a scheduling assignment (SA) signal contains resource occupation information according to an embodiment of the present invention.

In FIGS. 14a to 14c, the horizontal direction refers to the time domain and the vertical direction refers to the frequency domain.

FIG. 14a is a diagram when a scheduling assignment (SA) resource of individual transmitting terminals is implicitly related to a data resource according to a pre-defined rule. When a terminal (e.g., terminal C) plans to transmit SA and data, it is assumed that there are terminal A that has been transmitting SA 1400 and data 1401 and 1402 and terminal B that has been transmitting SA 1403 and data 1404 and 1405, before the terminal transmits SA and data. In this case, it is assumed that the data is pre-defined to use the same frequency resource as the related SA and transmitted with two times of repetition.

For example, the data 1401 and 1402 transmitted by terminal A is pre-defined to use the same frequency resource as the SA 1401 related to the data. The data 1401 and 1402 is transmitted with two times of repletion as shown in FIG. 14a. Similarly, the data 1404 and 1405 transmitted by terminal B is transmitted, via the same frequency resource as the SA 1403 related to the data, with two times of repletion, according to a pre-defined rule. It should be understood that the cycle and the number of data repetition transmission are not limited to the embodiment but may be set to any values, respectively.

As described above, the terminal A and terminal B occupies specific resources in an SA transmittable/receivable resource region 1406 before a terminal (e.g., terminal C) transmits SA and data and a data resource region 1407 before terminal C transmits SA and data. In this case, in an SA transmittable/receivable resource region 1408 after resource regions 1406 and 1407 that the terminal A and terminal B occupy and transmit SA and data to, terminal C planning to a new SA may perform an energy sensing process before the SA transmittable/receivable resource region 1408. For example, terminal C may perform an energy sensing process for the data resource region 1407 that terminal A and terminal B occupy in order to transmit data. The terminal C ascertains that there is a terminal occupying resource 1409 and resource 1410, based on the result of the energy sensing process. In this case, the terminal C may not apply the two resources, i.e., resource 1409 and resource 1410, to the SA transmission. However, the terminal C planning to transmit SA does not determine whether the terminal A or terminal B will continue to occupy the SA resource region and data resource region, by performing only the energy sensing process for the data resource region 1408 occupied by the terminal A or terminal B. Therefore, when the terminal A or terminal B ends the resource occupation, terminal C planning to transmit SA may miss available resources, which is disadvantageous.

FIG. 14b is a diagram when an SA signal of individual transmitting terminals explicitly notifies the related data resource. When a terminal (e.g., terminal C) plans to transmit SA and data, it is assumed that there are terminal A that has been transmitting SA 1411 and data 1412 and 1413 and terminal B that has been transmitting SA 1414 and data 1404 and 1415, before the terminal transmits SA and data. In this case, it is assumed that the data uses a frequency resource according to resource allocation information notified by the related SA and is transmitted with two times of repetition. For example, the data 1412 and 1413 transmitted by terminal A is transmitted with two times of repetition, using a frequency resource according to resource allocation information notified by the related SA 1411. Similarly, the data 1415 and 1416 transmitted by terminal B is transmitted with two times of repetition, using a frequency resource according to resource allocation information notified by the related SA 1414. It should be understood that the cycle and the number of data repetition transmission are not limited to the embodiment but may be set to any values, respectively.

A terminal (e.g., terminal C) planning to transmit a new SA is capable of performing an energy sensing process in a resource region before a transmittable/receivable resource region 1408 to which terminal C plans to a corresponding SA. However, useful information for selecting an SA transmission resource by terminal C may not be obtained from a data resource region 1407 that terminal A and terminal B occupy and transmit data to before terminal C transmits SA and data. This is because the data resource is not related to a resource of the related SA. Therefore, terminal C planning to a new SA needs to perform a channel sensing process for an SA transmittable/receivable resource region 1406 before a transmittable/receivable resource region 1408 to which terminal C plans to a corresponding SA. The terminal C ascertains that there is a terminal occupying resource 1417 and resource 1418, based on the result of the channel sensing process. In this case, the terminal C may not apply the two resources, i.e., resource 1417 and resource 1418, to the SA transmission. However, the terminal C planning to transmit SA does not determine whether the terminal A or terminal B will continue to occupy the SA resource region and data resource region, by performing only the energy sensing process for the data resource region 1408 occupied by the terminal A or terminal B. Therefore, when the terminal A or terminal B ends the resource occupation, terminal C planning to transmit SA may miss available resources, which is disadvantageous.

FIG. 14c shows a diagram that describes a method of performing D2D communication when a scheduling assignment (SA) signal contains resource occupation information according to an embodiment of the present invention. The data resource may be determined according to resource allocation information explicitly notified by the related SA or may be implicitly determined according to resources of the related SA. Since it detailed description was already explained above, it is omitted below. It should be understood that the cycle and the number of data repetition transmission are not limited to the embodiment but may be set to any values, respectively.

In a state where a terminal (e.g., terminal C) plans to transmit SA and data, when there is terminal A that has been transmitting SA 1420 and data related to the SA 1420 before the terminal transmits SA and data, the SA 1420 of terminal A may contain information (e.g., 1 bit of information) indicating a condition as to whether it continues to occupy a resource in the next SA transmittable/receivable resource region 1408. When terminal C plans to transmit a new SA in an SA transmittable/receivable resource region 1408 next to the resource regions 1406 and 1407 that terminal A and terminal B has occupied and transmitted SA and data to, it may perform an energy sensing process or an SA monitoring process before the SA transmittable/receivable resource region 1408. When terminal C ascertains that the next SA transmittable/receivable resource region exists in the currently received SA and SAs thereafter, based on the result of the energy sensing process or the SA monitoring process, it may discover a condition as to whether resources occupied by the received SAs will continue to be used. That is, when information regarding a condition as to whether terminal A continues to occupy resources, contained in SA 1420 transmitted by terminal A, indicates that terminal A will continue to occupy resources, a receiving terminal (i.e., terminal C) may discover that resource 1421 cannot be used in the next SA transmittable/receivable resource region 1408. In this case, according to embodiments, the SA may contain information regarding the number of cycles of an SA transmittable/receivable resource region that resources will continue to occupy, instead of a condition as to whether to occupy the next SA transmittable/receivable resource.

When there is terminal B that has been transmitting SA 1422 and data related to the SA 1422 before the terminal transmits SA and data, the SA 1422 of terminal B may contain information indicating a condition as to whether it continues to occupy a resource in the next SA transmittable/receivable resource region 1408. When information indicating a condition as to whether terminal B continues to occupy resources, contained in the SA 1422, indicates that terminal B does not occupy resources, a receiving terminal (i.e., terminal C) may discover that resource 1423 can be used in the next transmittable/receivable resource region 1408.

Although the embodiment is implemented in such a way that one bit of information indicates a condition as to whether a terminal will continue to occupy an SA resource, it should be understood that the present invention is not limited to the embodiment. It may also be modified in such a way as to indicate a condition as to whether a terminal will continue to occupy resources in a number of SA transmittable/receivable resource regions, using two or more bits.

Although the embodiments were described based on 3GPP LTE uplink-based transmission schemes, it should be understood that the present invention can also be applied to other transmission schemes.

The embodiments of the present invention described in the description and drawings are merely provided to assist in a comprehensive understanding of the invention and are not suggestive of limitation. Although embodiments of the invention have been described in detail above, it should be understood that many variations and modifications of the basic inventive concept herein described, which may be apparent to those skilled in the art, will still fall within the spirit and scope of the embodiments of the invention as defined in the appended claims.

The invention claimed is:

1. A device-to-device (D2D) communication method by a transmitting terminal comprising:
    creating a first scheduling assignment (SA) signal for transmission in a first SA resource of a SA resource pool including information indicating whether the transmitting terminal occupies a second SA resource of a next SA resource pool corresponding to the first SA resource; and
    transmitting, to a receiving terminal, the first SA signal in the first SA resource,
    wherein an energy sensing is performed by the receiving terminal in a data resource region associated with the SA resource pool, and
    wherein a second SA signal is transmitted by the receiving terminal in the second SA resource of the next SA resource pool after the energy sensing when the information included in the first SA signal indicates that the transmitting terminal does not occupy the second SA resource.

2. A device-to-device (D2D) communication method by a receiving terminal comprising:
    receiving, from a transmitting terminal, a first scheduling assignment (SA) signal in a first SA resource of a SA resource pool;
    detecting, from the first SA signal, information indicating whether the transmitting terminal occupies a second SA resource of a next SA resource pool corresponding to the first SA resource;
    performing an energy sensing in a data resource region associated with the SA resource pool; and
    transmitting a second SA signal in the second SA resource of the next SA resource pool when the information included in the first SA signal indicates that the transmitting terminal does not occupy the second SA resource.

3. The method of claim 2, wherein the receiving of the first SA signal comprises:
    receiving the first SA signal via an SA monitoring.

4. A transmitting terminal for supporting device-to-device (D2D) communication comprising:
    a transceiver; and
    a controller coupled with the transceiver and configured to control to:
        create a first scheduling assignment (SA) signal for transmission in a first SA resource of a SA resource pool including information indicating whether the transmitting terminal occupies a second SA resource of a next SA resource pool corresponding to the first SA resource, and
        transmit, to a receiving terminal, the first SA signal in the first SA resource,
    wherein an energy sensing is performed by the receiving terminal in a data resource region associated with the SA resource pool, and
    wherein a second SA signal is transmitted by the receiving terminal in the second SA resource of the next SA resource pool after the energy sensing when the information included in the first SA signal indicates that the transmitting terminal does not occupy the second SA resource.

5. A receiving terminal for supporting device-to-device (D2D) communication comprising:
    a transceiver; and
    a controller coupled with the transceiver and configured to control to:
        receive, from a transmitting terminal, a first scheduling assignment (SA) signal in a first SA resource of a SA resource pool,
        detect, from the first SA signal, information indicating whether the transmitting terminal occupies a second SA resource of a next SA resource pool corresponding to the first SA resource,
        performing an energy sensing in a data resource region associated with the SA resource pool, and
        transmit a second SA signal in the second SA resource of the next SA resource pool when the information included in the first SA signal indicates that the transmitting terminal does not occupy the second SA resource.

6. The receiving terminal of claim 5, wherein the controller controls the reception of the first SA signal via an SA monitoring.

* * * * *